US011432176B2

(12) United States Patent
Hao et al.

(10) Patent No.: US 11,432,176 B2
(45) Date of Patent: Aug. 30, 2022

(54) TECHNIQUES FOR NON-ZERO-POWER BEAMS IN WIRELESS SYSTEMS

(71) Applicant: Qualcomm Incorporated, San Diego, CA (US)

(72) Inventors: Chenxi Hao, Beijing (CN); Yu Zhang, Beijing (CN); Liangming Wu, Beijing (CN); Chao Wei, Beijing (CN); Wanshi Chen, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/638,213

(22) PCT Filed: Aug. 10, 2018

(86) PCT No.: PCT/CN2018/099880
§ 371 (c)(1),
(2) Date: Feb. 11, 2020

(87) PCT Pub. No.: WO2019/029675
PCT Pub. Date: Feb. 14, 2019

(65) Prior Publication Data
US 2020/0367083 A1  Nov. 19, 2020

(30) Foreign Application Priority Data

Aug. 11, 2017 (WO) ................ PCT/CN2017/097206

(51) Int. Cl.
*H04W 24/10* (2009.01)
*H04B 7/06* (2006.01)
*H04L 5/00* (2006.01)

(52) U.S. Cl.
CPC ............ *H04W 24/10* (2013.01); *H04B 7/063* (2013.01); *H04B 7/0626* (2013.01); *H04B 7/0695* (2013.01); *H04L 5/0048* (2013.01)

(58) Field of Classification Search
CPC ..... H04B 7/0626; H04B 7/063; H04B 7/0695
See application file for complete search history.

(56) References Cited

U.S. PATENT DOCUMENTS

2010/0172424 A1\*  7/2010  Perets ................... H04L 1/0656
375/260
2011/0243012 A1\*  10/2011  Luo ....................... H04L 5/0064
370/252

(Continued)

FOREIGN PATENT DOCUMENTS

CN       103391124 A      11/2013
CN       108462552 A   \*  8/2018   .......... H04J 13/0077

(Continued)

OTHER PUBLICATIONS

International Search Report and Written Opinion—PCT/CN2017/097206—ISA/EPO—dated May 3, 2018.

(Continued)

*Primary Examiner* — Sophia Vlahos
(74) *Attorney, Agent, or Firm* — Holland & Hart LLP

(57) ABSTRACT

Some wireless communication networks may improve communication reliability and/or throughput using multiple-input, multiple-output (MIMO) schemes. MIMO operation may in turn be supported by the use of channel state information reference signals (CSI-RS), which may allow communicating devices to estimate and leverage multipath channel conditions. However, the signaling used to support such communications may consume significant resources. In accordance with the described techniques, a user equipment (UE) may identify non-zero-power beams based on received CSI-RS. The non-zero-power beams may contribute to the (Continued)

final precoding vector. Rather than transmitting beam coefficients relating to zero-power beams, the UE may instead indicate a presence of these zero-power beams to the base station (e.g., by indicating a number of non-zero-power beams). Such techniques may reduce overhead of the communications or otherwise benefit the system.

77 Claims, 14 Drawing Sheets

(56) References Cited

U.S. PATENT DOCUMENTS

| | | | |
|---|---|---|---|
| 2014/0086084 A1 | 3/2014 | Bi et al. | |
| 2015/0222347 A1 | 8/2015 | Xia et al. | |
| 2016/0359538 A1* | 12/2016 | Onggosanusi | H04L 5/0057 |
| 2017/0026938 A1* | 1/2017 | Onggosanusi | H04B 7/0626 |
| 2017/0047978 A1* | 2/2017 | Kim | H04B 7/0626 |
| 2017/0245165 A1* | 8/2017 | Onggosanusi | H04L 5/0094 |
| 2019/0089423 A1* | 3/2019 | Davydov | H04B 7/0478 |

FOREIGN PATENT DOCUMENTS

| | | |
|---|---|---|
| WO | WO-2016195335 A1 | 12/2016 |
| WO | WO-2017018839 A1 | 2/2017 |
| WO | WO-2017028749 A1 | 2/2017 |
| WO | WO-2017076139 A1 | 5/2017 |
| WO | WO-2017078785 A1 | 5/2017 |
| WO | WO-2018203815 A1 * | 11/2018 ........ H04W 36/0094 |

OTHER PUBLICATIONS

International Search Report and Written Opinion—PCT/CN2018/099880—ISA/EPO—dated Oct. 23, 2018.
Nokia, et al., "Feedback Transmission of Type II Codebook", 3GPP Draft, 3GPP TSG RAN WG1 NR Ad-Hoc#2, R1-1711590-Qingdao-Feedback Transmission of Type II Codebook, 3rd Generation Partnership Project (3GPP), Mobile Competence Centre, 650, Route Des Lucioles, F-06921 Sophia-Antipolis Cedex, vol. RAN WG1, no. Qingdao, P.R. China, Jun. 27, 2017-Jun. 30, 2017, Jun. 26, 2017 (Jun. 26, 2017), XP051300765, 6 Pages, Retrieved from the Internet: URL:http://www.3gpp.org/ftp/Meetings_3GPP_SYNC/RAN1/Docs/ [retrieved on Jun. 26, 2017] the Whole Document.
Samsung: "Remaining Details of Type I and Type II CSI Codebooks", 3GPP Draft, R1-1710670, 3GPP TSG RAN WG1 NR Ad-Hoc#2, Remaining Details of Type I and Type II CSI Codebooks, 3rd Generation Partnership Project (3GPP), Mobile Competence Centre, 650, Route Des Lucioles, F-06921 Sophia-AntipolisC, vol. RAN WG1, no. Qingdao, China, Jun. 27, 2017-Jun. 30, 2017, Jun. 16, 2017 (Jun. 16, 2017), XP051304522, 6 Pages, Retrieved from the Internet: URL:http://www.3gpp.org/ftp/tsg_ran/WG1_RL1/TSGR1_AH/NR_AH_1706/Docs/[retrieved on-Jun. 16, 2017] the Whole Document.
Supplementary European Search Report—EP18844223—Search Authority—Munich—dated Apr. 1, 2021.

* cited by examiner

TECHNIQUES FOR NON-ZERO-POWER BEAMS IN WIRELESS SYSTEMS

CROSS REFERENCES

The present 371 application for patent claims priority to International Patent Application No. PCT/CN2018/099880 by HAO et al., entitled "TECHNIQUES FOR NON-ZERO-POWER BEAMS IN WIRELESS SYSTEMS," filed Aug. 10, 2018; and to International Patent Application No. PCT/CN2017/097206 to HAO et. al., entitled "TECHNIQUES FOR NON-ZERO-POWER BEAMS IN WIRELESS SYSTEMS," filed Aug. 11, 2017, each of which is assigned to the assignee hereof.

BACKGROUND

The following relates generally to wireless communication, and more specifically to techniques for non-zero-power beams in wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-s-OFDM). A wireless multiple-access communications system may include a number of base stations or network access nodes, each simultaneously supporting communication for multiple communication devices, which may be otherwise known as user equipment (UE).

Some wireless communications systems may support the use of linear combination codebooks (e.g., to support multiple-input, multiple-output (MIMO) communications). In some cases, linear combination codebooks may alternatively be referred to as Type II codebooks (e.g., or Type II port selection codebooks). For example, MIMO communications may rely on transmission of channel state information reference signals (CSI-RS) over one or more antenna ports. Each CSI-RS may be transmitted over a corresponding beam, where each beam is formed based on a weighted (e.g., phase and amplitude-modulated) combination of antenna elements within a two-dimensional antenna array. Alternatively, CSI-RS transmissions may not be beamformed (e.g., the CSI-RS corresponding to a given antenna port may be mapped to antenna elements of the antenna array without precoding). In either case, the linear combination codebook may enable selection of a linear combination of beams for communicating devices. For example, the beams may be selected based at least in part on CSI feedback from a receiving device (e.g., a UE). That is, the UE may report the selected beams and associated coefficients to allow the network to learn about the communication channel (e.g., for scheduling, multi-user pairing, multi-user precoder calculations, etc.). Such reports may consume significant uplink time-frequency resources. Improved techniques to reduce the overhead of these reports may be desired.

SUMMARY

The described techniques relate to improved methods, systems, devices, or apparatuses that support techniques for non-zero-power beams in wireless systems. Generally, the described techniques provide for reducing the payload of channel state information (CSI) reports for multiple-input, multiple-output (MIMO) communications. In accordance with the described techniques, a wireless node (e.g., a base station) may configure a user equipment (UE) to report CSI for a number of beams (e.g., four (4) beams) over one or more spatial layers. The base station may then transmit CSI-RS over a set of antenna ports (e.g., eight (8) antenna ports). In some cases, precoding may be applied to each antenna port (e.g., such that the CSI-RS may be beamformed). Alternatively, the CSI-RS may be transmitted over each antenna port without precoding.

Upon receiving the CSI-RS, the UE may perform channel measurements and compute CSI for reporting. For example, in the case that CSI-RS is not beamformed, the UE may estimate the channel between itself and the base station and perform beam selection (e.g., from a codebook known to the UE and the network). Alternatively, if the CSI-RS is beamformed, the UE may estimate the composite channel (e.g., the channel including various multipath effects) between itself and the base station. For example, based on the channel estimates, the UE may identify which beams provide the greatest spectral efficiency across one or more spatial layers and indicate the identified beams in the CSI report. However, in some cases a given spatial layer may use fewer than the configured number of beams (e.g., may only use three (3) beams). That is, the contribution of the fourth beam to the given spatial layer may be relatively low (e.g., or non-existent). In such an example, the given spatial layer may be said to comprise three non-zero-power beams and one zero-power beam. In accordance with the described techniques, a UE may include in the CSI report an indicator of the non-zero-power beam(s) for the given spatial layer (e.g., and may omit beam coefficients for the zero-power beam). Various indicator configurations are considered and discussed below. Such techniques may reduce the payload of the CSI report, which may in turn improve throughput or otherwise benefit a wireless communications system.

A method of wireless communication is described. The method may include receiving a configuration indicating a number of beams to be reported in a CSI report, receiving a set of reference signals, identifying, for one or more spatial layers and based at least in part on the set of reference signals, a set of beams corresponding to the number of beams for reporting in the CSI report, generating the CSI report comprising at least one beam coefficient for each non-zero-power beam in the set of beams for each of the one or more spatial layers and an indicator of at least one non-zero-power beam, and transmitting the CSI report.

An apparatus for wireless communication is described. The apparatus may include means for receiving a configuration indicating a number of beams to be reported in a CSI report, means for receiving a set of reference signals, means for identifying, for one or more spatial layers and based at least in part on the set of reference signals, a set of beams corresponding to the number of beams for reporting in the CSI report, means for generating the CSI report comprising at least one beam coefficient for each non-zero-power beam in the set of beams for each of the one or more spatial layers and an indicator of at least one non-zero-power beam, and means for transmitting the CSI report.

Another apparatus for wireless communication is described. The apparatus may include a processor, memory in electronic communication with the processor, and instructions stored in the memory. The instructions may be operable to cause the processor to receive a configuration indicating a number of beams to be reported in a CSI report, receive a set of reference signals, identify, for one or more spatial layers and based at least in part on the set of reference signals, a set of beams corresponding to the number of beams for reporting in the CSI report, generate the CSI report comprising at least one beam coefficient for each non-zero-power beam in the set of beams for each of the one or more spatial layers and an indicator of at least one non-zero-power beam, and transmit the CSI report.

A non-transitory computer readable medium for wireless communication is described. The non-transitory computer-readable medium may include instructions operable to cause a processor to receive a configuration indicating a number of beams to be reported in a CSI report, receive a set of reference signals, identify, for one or more spatial layers and based at least in part on the set of reference signals, a set of beams corresponding to the number of beams for reporting in the CSI report, generate the CSI report comprising at least one beam coefficient for each non-zero-power beam in the set of beams for each of the one or more spatial layers and an indicator of at least one non-zero-power beam, and transmit the CSI report.

In some examples of the method, apparatus, and non-transitory computer-readable medium described above, the configuration indicates a port-selection codebook and the set of beams comprises a set of non-zero-power antenna ports.

In some examples of the method, apparatus, and non-transitory computer-readable medium described above, the indicator of the at least one non-zero-power beam comprises an indicator of zero-power beams, and a set of non-zero-power beams is determined based on the indicator and the set of beams In some examples of the method, apparatus, and non-transitory computer-readable medium described above, identifying the set of beams comprises identifying the at least one non-zero-power beam for at least one of a first set of antenna ports or a second set of antenna ports for the one or more spatial layers. The first set of antenna ports or the second set of antenna ports may correspond to a same polarization, or a same antenna panel, or a combination thereof.

In some examples of the method, apparatus, and non-transitory computer-readable medium described above, the indicator comprises a set of bits indicating a number of the non-zero-power beams in the set of beams, each non-zero-power beam of the number of the non-zero-power beams applying to the first set of antenna ports and the second set of antenna ports on each of the one or more spatial layers. In some examples of the method, apparatus, and non-transitory computer-readable medium described above, the indicator comprises a set of bits indicating a set of non-zero-power beams in the set of beams, each non-zero-power beam of the set of non-zero-power beams applying to the first set of antenna ports and the second set of antenna ports on each of the one or more spatial layers. In some examples of the method, apparatus, and non-transitory computer-readable medium described above, the set of bits indicating the set of non-zero-power beams in the set of beams comprises a power indicator bit for each beam of the set of non-zero-power beams.

In some examples of the method, apparatus, and non-transitory computer-readable medium described above, the indicator comprises a first set of bits indicating a first number of non-zero-power beams for the first set of antenna ports and the second set of antenna ports for a first spatial layer of the one or more spatial layers and a second set of bits indicating a second number of non-zero-power beams for the first set of antenna ports and the second set of antenna ports for a second spatial layer of the one or more spatial layers. In some examples of the method, apparatus, and non-transitory computer-readable medium described above, the indicator comprises a first set of bits indicating a first set of non-zero-power beams for the first set of antenna ports and the second set of antenna ports for a first spatial layer of the one or more spatial layers and a second set of bits indicating a second set of non-zero-power beams for the first set of antenna ports and the second set of antenna ports for a second spatial layer of the one or more spatial layers. In some examples of the method, apparatus, and non-transitory computer-readable medium described above, each set of bits comprises a power indicator bit for each beam of the corresponding set of non-zero-power beams.

In some examples of the method, apparatus, and non-transitory computer-readable medium described above, the indicator comprises a first set of bits indicating a first number of non-zero-power beams in the set of beams for the first set of antenna ports and a second set of bits indicating a second number of non-zero-power beams in the set of beams for the second set of antenna ports, each non-zero-power beam of the first number of non-zero-power beams and each non-zero-power beam of the second number of non-zero-power beams applying to each of the one or more spatial layers. In some examples of the method, apparatus, and non-transitory computer-readable medium described above, the indicator comprises a first set of bits indicating a first set of non-zero-power beams in the set of beams for the first set of antenna ports and a second set of bits indicating a second set of non-zero-power beams in the set of beams for the second set of antenna ports, each non-zero-power beam of the first set of non-zero-power beams and each non-zero-power beam of the second set of non-zero-power beams applying to each of the one or more spatial layers. In some examples of the method, apparatus, and non-transitory computer-readable medium described above, the first set of bits comprises a power indicator bit for each beam of the set of non-zero-power beams over the first set of antenna ports and the second set of bits comprises a power indicator bit for each beam of the set of non-zero-power beams over the second set of antenna ports.

In some examples of the method, apparatus, and non-transitory computer-readable medium described above, the one or more spatial layers comprise a plurality of spatial layers, and wherein the indicator comprises a respective set of bits indicating a respective number of non-zero-power beams for each of the first set of antenna ports and the second set of antenna ports for each of the plurality of spatial layers. In some examples of the method, apparatus, and non-transitory computer-readable medium described above, the one or more spatial layers comprise a plurality of spatial layers, and wherein the indicator comprises a respective set of bits indicating a respective set of non-zero-power beams for each of the first set of antenna ports and the second set of antenna ports for each of the plurality of spatial layers. In some examples of the method, apparatus, and non-transitory computer-readable medium described above, each of the respective sets of bits comprises a power indicator bit for each beam of the set of non-zero-power beams for a corresponding set of antenna ports and a corresponding spatial layer.

In some examples of the method, apparatus, and non-transitory computer-readable medium described above, the CSI report further comprises a rank indication (RI). In some examples of the method, apparatus, and non-transitory computer-readable medium described above, the RI and the indicator may be encoded separately.

In some examples of the method, apparatus, and non-transitory computer-readable medium described above, the beam coefficients for each non-zero-power beam of the set of beams comprise a wideband beam amplitude, a subband beam amplitude, a subband beam phase, or a combination thereof.

In some examples of the method, apparatus, and non-transitory computer-readable medium described above, a reporting payload size of the beam coefficients for each non-zero-power beam of the set of beams may be based at least in part on the indicator.

In some examples of the method, apparatus, and non-transitory computer-readable medium described above, the configuration may be received via radio resource control (RRC) signaling, a medium access control (MAC) control element (CE), or downlink control signaling, the configuration further comprising a reporting setting.

A method of wireless communication is described. The method may include transmitting, to a UE, a configuration indicating a number of beams to be reported in a CSI report, transmitting a set of reference signals, receiving the CSI report from the UE, wherein the CSI report indicates a set of beams corresponding to the number of beams for reporting in the CSI report, the CSI report further comprising at least one beam coefficient for each non-zero-power beam of the set of beams for each of one or more spatial layers and an indicator of a number of the beam coefficients, and parsing the set of beam coefficients based at least in part on the CSI report.

An apparatus for wireless communication is described. The apparatus may include means for transmitting, to a UE, a configuration indicating a number of beams to be reported in a CSI report, means for transmitting a set of reference signals, means for receiving the CSI report from the UE, wherein the CSI report indicates a set of beams corresponding to the number of beams for reporting in the CSI report, the CSI report further comprising at least one beam coefficient for each non-zero-power beam of the set of beams for each of one or more spatial layers and an indicator of at least one non-zero-power beam, and means for parsing the beam coefficients based at least in part on the CSI report.

Another apparatus for wireless communication is described. The apparatus may include a processor, memory in electronic communication with the processor, and instructions stored in the memory. The instructions may be operable to cause the processor to transmit, to a UE, a configuration indicating a number of beams to be reported in a CSI report, transmit a set of reference signals, receive the CSI report from the UE, wherein the CSI report indicates a set of beams corresponding to the number of beams for reporting in the CSI report, the CSI report further comprising at least one beam coefficient for each non-zero-power beam of the set of beams for each of one or more spatial layers and an indicator of a number of the beam coefficients, and parse the beam coefficients based at least in part on the CSI report.

A non-transitory computer readable medium for wireless communication is described. The non-transitory computer-readable medium may include instructions operable to cause a processor to transmit, to a UE, a configuration indicating a number of beams to be reported in a CSI report, transmit a set of reference signals, receive the CSI report from the UE, wherein the CSI report indicates a set of beams corresponding to the number of beams for reporting in the CSI report, the CSI report further comprising at least one beam coefficient for each non-zero-power beam of the set of beams for each of one or more spatial layers and an indicator of at least one non-zero-power beam, and parse the beam coefficients based at least in part on the CSI report.

In some examples of the method, apparatus, and non-transitory computer-readable medium described above, transmitting the set of reference signals includes transmitting reference signals over respective antenna ports, wherein each beam of the set of beams corresponds to one of the antenna ports.

In some examples of the method, apparatus, and non-transitory computer-readable medium described above, the indicator of the at least one non-zero-power beam comprises an indicator of zero-power beams, and the set of non-zero-power beams is determined based on the indicator and the set of beams.

In some examples of the method, apparatus, and non-transitory computer-readable medium described above, the set of beams applies to a first set of antenna ports and a second set of antenna ports. The first set of antenna ports or the second set of antenna ports may correspond to a same polarization, or a same antenna panel, or a combination thereof.

In some examples of the method, apparatus, and non-transitory computer-readable medium described above, the indicator comprises a set of bits indicating a number of non-zero-power beams in the set of beams, each non-zero-power beam of the number of non-zero-power beams applying to the first set of antenna ports and the second set of antenna ports on each of the one or more spatial layers. In some examples of the method, apparatus, and non-transitory computer-readable medium described above, the indicator comprises a set of bits indicating a set of non-zero-power beams in the set of beams, each non-zero-power beam of the set of non-zero-power beams applying to the first set of antenna ports and the second set of antenna ports on each of the one or more spatial layers. In some examples of the method, apparatus, and non-transitory computer-readable medium described above, the set of bits indicating the set of non-zero-power beams in the set of beams comprises a power indicator bit for each beam of the set of non-zero-power beams.

In some examples of the method, apparatus, and non-transitory computer-readable medium described above, the indicator comprises a first set of bits indicating a first number of non-zero-power beams for the first set of antenna ports and the second set of antenna ports for a first spatial layer of the one or more spatial layers and a second set of bits indicating a second number of non-zero-power beams for the first set of antenna ports and the second set of antenna ports for a second spatial layer of the one or more spatial layers. In some examples of the method, apparatus, and non-transitory computer-readable medium described above, the indicator comprises a first set of bits indicating a first set of non-zero-power beams for the first set of antenna ports and the second set of antenna ports for a first spatial layer of the one or more spatial layers and a second set of bits indicating a second set of non-zero-power beams for the first set of antenna ports and the second set of antenna ports for a second spatial layer of the one or more spatial layers. In some examples of the method, apparatus, and non-transitory computer-readable medium described above, each set of bits comprises a power indicator bit for each beam of the corresponding set of non-zero-power beams.

In some examples of the method, apparatus, and non-transitory computer-readable medium described above, the indicator comprises a first set of bits indicating a first number of non-zero-power beams in the set of beams for the first set of antenna ports and a second set of bits indicating a second number of non-zero-power beams in the set of beams for the second set of antenna ports, each non-zero-power beam of the first number of non-zero-power beams and each non-zero-power beam of the second number of non-zero-power beams applying to each of the one or more spatial layers. In some examples of the method, apparatus, and non-transitory computer-readable medium described above, the indicator comprises a first set of bits indicating a first set of non-zero-power beams in the set of beams for the first set of antenna ports and a second set of bits indicating a second set of non-zero-power beams in the set of beams for the second set of antenna ports, each non-zero-power beam of the first set of non-zero-power beams and each non-zero-power beam of the second set of non-zero-power beams applying to each of the one or more spatial layers. In some examples of the method, apparatus, and non-transitory computer-readable medium described above, the first set of bits comprises a power indicator bit for each beam of the set of non-zero-power beams over the first set of antenna ports and the second set of bits comprises a power indicator bit for each beam of the set of non-zero-power beams over the second set of antenna ports.

In some examples of the method, apparatus, and non-transitory computer-readable medium described above, the one or more spatial layers comprise a plurality of spatial layers, and wherein the indicator comprises a respective set of bits indicating a respective number of non-zero-power beams for each of the first set of antenna ports and the second set of antenna ports for each of the plurality of spatial layers. In some examples of the method, apparatus, and non-transitory computer-readable medium described above, the one or more spatial layers comprise a plurality of spatial layers, and wherein the indicator comprises a respective set of bits indicating a respective set of non-zero-power beams for each of the first set of antenna ports and the second set of antenna ports for each of the plurality of spatial layers. In some examples of the method, apparatus, and non-transitory computer-readable medium described above, each of the respective sets of bits comprises a power indicator bit for each beam of the set of non-zero-power beams for a corresponding set of antenna ports and a corresponding spatial layer.

In some examples of the method, apparatus, and non-transitory computer-readable medium described above, the one or more spatial layers comprise a plurality of spatial layers, and wherein the indicator comprises a respective set of bits indicating a respective number of non-zero-power beams for each of the first set of antenna ports and the second set of antenna ports for each of the plurality of spatial layers. In some examples of the method, apparatus, and non-transitory computer-readable medium described above, each of the respective sets of bits comprises a beam index and a power indicator bit for each beam of the set of beams for a corresponding set of antenna ports and a corresponding spatial layer.

In some examples of the method, apparatus, and non-transitory computer-readable medium described above, the CSI report further comprises a RI. In some examples of the method, apparatus, and non-transitory computer-readable medium described above, the RI and the indicator may be encoded separately.

In some examples of the method, apparatus, and non-transitory computer-readable medium described above, the at least one beam coefficient for each non zero-power beam of the subset comprises a wideband beam amplitude, a subband beam amplitude, a subband beam phase, or a combination thereof.

In some examples of the method, apparatus, and non-transitory computer-readable medium described above, a reporting payload size of the beam coefficients for each non-zero-power beam of the set of beams may be based at least in part on the indicator.

In some examples of the method, apparatus, and non-transitory computer-readable medium described above, the configuration may be transmitted via radio resource control (RRC) signaling, a medium access control (MAC) control element (CE), or downlink control signaling, the configuration further comprising a reporting setting.

DETAILED DESCRIPTION

Figure 1:
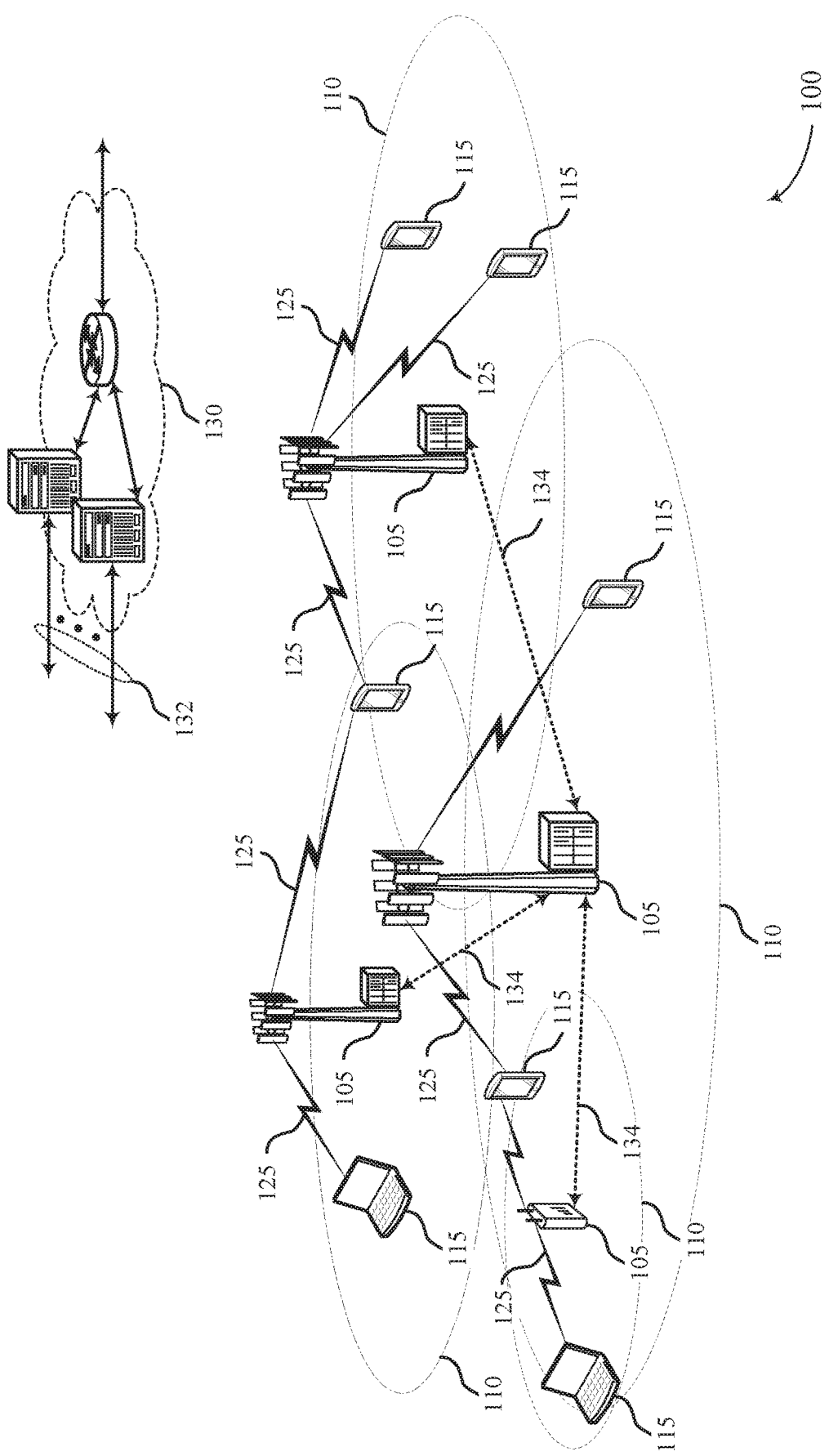
FIG. 1 illustrates an example of a system for wireless communication that supports techniques for non-zero-power beams in accordance with aspects of the present disclosure.

MIMO communications are widely employed to improve communication throughput in a wireless system. As described herein, MIMO communications may refer to transmission of signals from antenna elements of a transmitting device such that the signals coherently combine at antenna elements of a receiving device (i.e., which may be referred to as receive diversity). Such transmissions may improve the reliability of the communications (e.g., may boost a signal to noise ratio (SNR), reduce a block error rate, etc.). Additionally or alternatively, MIMO communications may employ spatial multiplexing in which multiple parallel data streams are transmitted over distinct spatial layers. Spatial multiplexing depends on the correlation between the transmitted beams. If signals of two transmitted beams experience similar multipath effects, the received versions of the signals may be highly correlated and the available spatial multiplexing gain relatively low (e.g., or non-existent). However, in a rich multi-path environment, spatial multiplexing may significantly boost system throughput.

MIMO operations may employ beamforming, which is a signal processing technique that may be used to shape an antenna beam. Beamforming may be achieved by combining antenna elements of an antenna array such that signals propagating at particular orientations with respect to the array experience constructive interference while others experience destructive interference. Amplitude and phase offsets may be applied to the antenna elements through the use of precoding applied over antenna ports to generate a desired interference pattern. Precoding may be defined by a beamforming weight set associated with a particular orientation.

To support MIMO communications, a base station may transmit reference signals over multiple antenna ports, where each antenna port is associated with one or more physical antennas (e.g., which may refer to a combination of antenna elements in an antenna array). A UE receiving some or all of the reference signals may perform channel measurements to determine characteristics of the communication environment. In some cases, the UE may be configured to determine and report beam weighting coefficients for a number of beams (e.g., where each beam is formed by a given precoding vector) for one or more spatial layers. However, as described further below, not all of the spatial layers may require the full complement of configured beams. In accordance with the described techniques, a UE may efficiently report CSI feedback by indicating a number of non-zero-power beams (e.g., rather than including coefficients for the zero-power beams in the CSI feedback).

Aspects of the disclosure are initially described in the context of a wireless communications system. Aspects of the disclosure are then described with reference to beam diagrams and process flows. Aspects of the disclosure are further illustrated by and described with reference to apparatus diagrams, system diagrams, and flowcharts that relate to non-zero-power beam indication for a linear combination codebook.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE, LTE-Advanced (LTE-A) network, or an NR network. In some cases, wireless communications system 100 may support enhanced broadband communications, ultra-reliable (e.g., mission critical) communications, low latency communications, and communications with low-cost and low-complexity devices. Wireless communications system 100 may support techniques for non-zero-power beams.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communication with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute frequency channel number (EARFCN)), and may be positioned according to a channel raster for discovery by UEs 115. Carriers may be downlink or uplink (e.g., in a frequency division duplexed (FDD) mode), or be configured to carry downlink and uplink communications (e.g., in a time division duplexed (TDD) mode). In some examples, signal waveforms transmitted over a carrier may be made up of multiple subcarriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. By way of example, an antenna array (e.g., or antenna panel) may be or include a set of antenna elements connected to the same digital transceiver chain. An antenna array (e.g., or antenna panel) may include analog phase control circuitry that beamforms transmissions from the array or panel.

To support MIMO operations, a base station 105 may configure a UE 115 to report CSI feedback. The CSI feedback may comprise beam coefficients for a number of beams identified using channel estimates based on the CSI-RS. In some cases, a UE 115 may identify at least one non-zero-power beam for one or more spatial layers. As described further below, the UE 115 may reduce a payload of the CSI feedback by including an indicator of a number of non-zero-power beams (e.g., and omitting beam coefficients for zero-power beams). Such a payload reduction may reduce power consumption of UE 115, improve communication throughput, or otherwise benefit wireless communications system 100.

Figure 2:
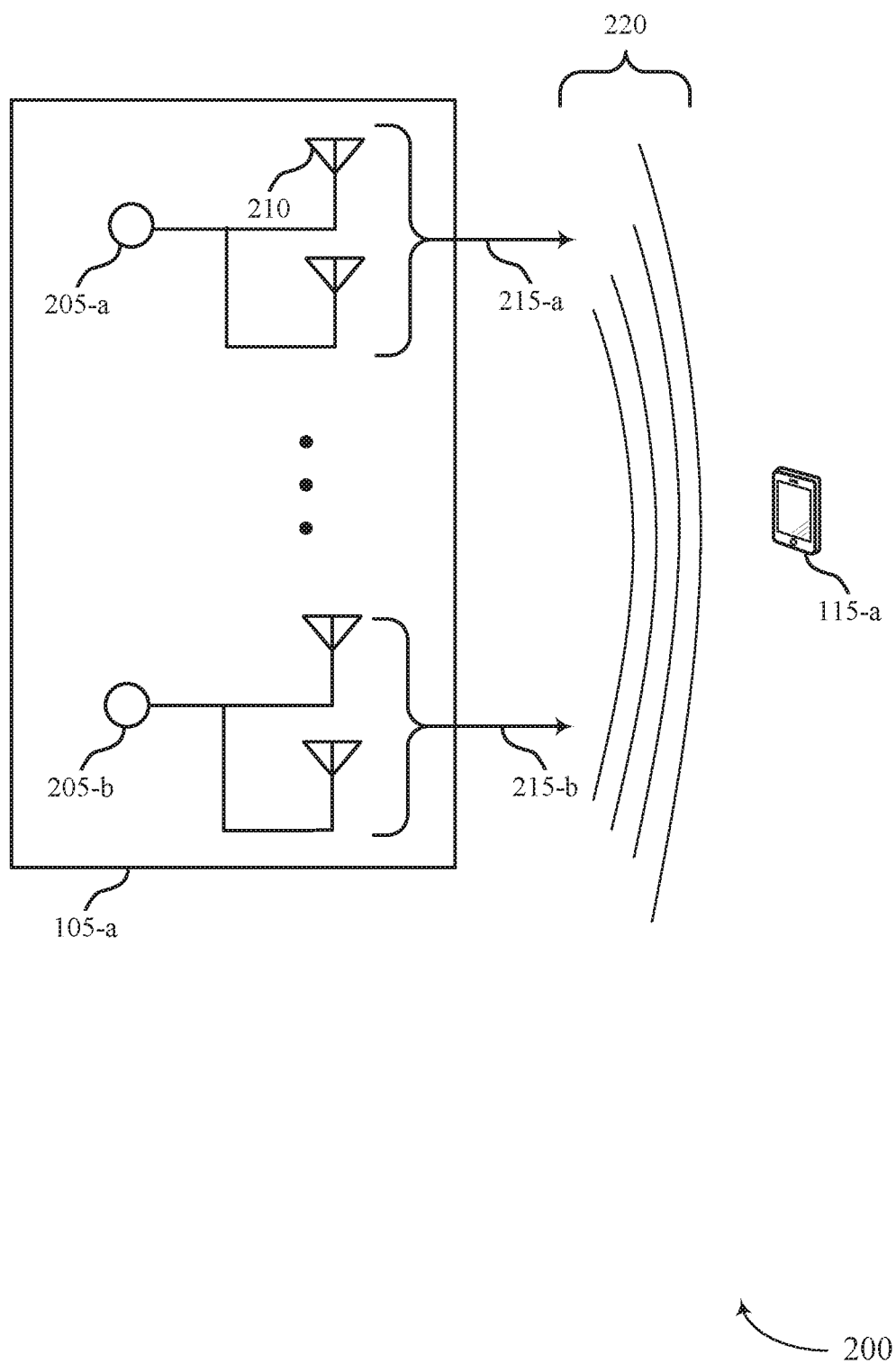
FIGS. 2 and 3 illustrate example wireless communication systems that support techniques for non-zero-power beams in wireless systems in accordance with aspects of the present disclosure.

FIG. 2 illustrates an example of a wireless communications system 200 that supports techniques for non-zero-power beams in accordance with various aspects of the present disclosure. Wireless communications system 200 includes a base station 105-*a* and a UE 115-*a*, each of which may be an example of the corresponding devices as described with reference to FIG. 1.

To support MIMO communications, base station 105-*a* may configure UE 115-*a* to report CSI for a number of beams (e.g., or antenna ports) to be used in conjunction with a linear combination codebook. To facilitate CSI reporting, base station 105-*a* may transmit CSI-RS 215 to UE 115-*a*. For example, base station 105-*a* may transmit a plurality of CSI-RS sequences over respective antenna ports 205 (e.g., with or without precoding). Each antenna port 205 may drive a subset of antenna elements at base station 105-*a* (e.g., each antenna port may be associated with one or more antenna elements). Upon receiving the CSI-RS 215, UE 115-*a* may estimate the channel 220 between itself and base station 105-*a* and generate a CSI report based on the estimate. By way of example, base station 105-*a* may transmit eight (8) CSI-RS sequences, each associated with a respective antenna port 205 (with FIG. 2 showing two of the eight antenna ports 205-*a* and 205-*b*). Each antenna port 205 may in turn drive one or more antenna element groups (e.g., one or more antennas 210) of base station 105-*a*. Accordingly, CSI-RS 215-*a* and CSI-RS 215-*b* may be transmitted from the group of antennas 210 corresponding to antenna port 205-*a* and antenna port 205-*b*, respectively. UE 115-*a* may in turn receive the CSI-RS 215 over one or more antennas and estimate channel characteristics (e.g., fading, channel delay, etc.).

In aspects, UE 115-*a* may identify beam(s) (e.g., or antenna ports) for a linear combination codebook that match the channel estimates. For example, the UE 115-*a* may estimate the raw (i.e., non-precoded) channel (e.g., H) and may use the channel estimates based on the CSI-RS 215 to identify a set of beams (e.g., corresponding to beams of a codebook) which contribute to a precoding vector for one or more spatial layers.

For each of the one or more spatial layers, UE 115-*a* may report CSI feedback indicating a linear combination of a subset of pre-coding vectors or matrices in a given pre-coding codebook. As an example, for each spatial layer, the precoding matrix may be given by $$\begin{bmatrix} w_{0,l} \\ w_{1,l} \end{bmatrix}$$

where $w_{r,l}$ is the precoder on the $r^{th}$ set of antenna ports for the $l^{th}$ layer. The precoding vector $w_{r,l}$ may be obtained by a linear combination (i.e., a weighted sum) of transmit beams. For example:

$$w_{r,l} = \sum_{i=0}^{L-1} b_{k_1^{(i)}, k_2^{(i)}} \times p_{r,l,i}^{WB} \times p_{r,l,i}^{SB} \times c_{r,l,i}$$

where L is the number of beams for which UE 115-$a$ is configured to report CSI feedback, $$b_{k_1^{(i)}, k_2^{(i)}}$$

is a two-dimensional DFT beam, and $p_{r,l,i}^{WB} \times p_{r,l,i}^{SB} \times c_{r,l,i}$ represents the weight of the $i^{th}$ beam of the $l^{th}$ layer. In this equation, $p_{r,l,i}^{WB}$ is the wideband beam amplitude, which may be drawn from a finite set (e.g., $\{1, \sqrt{0.5}, \sqrt{0.25}, \sqrt{0.125}, \sqrt{0.0625}, \sqrt{0.0313}, \sqrt{0.0156}, 0\}$); $p_{r,l,i}^{SB}$ is the subband beam amplitude, which may be drawn from another finite set (e.g., $\{1, \sqrt{0.5}\}$); and $c_{r,l,i}$ is the subband beam phase, which may be drawn from a third finite set (e.g., $$\left( \text{e.g., } \{e^{\frac{j\pi n}{2}}, n = 0, 1, 2, 3\} \text{ or } \{e^{\frac{j\pi n}{4}}, n = 0, 1, 2, \ldots, 7\} \right).$$

Base station 105-$a$ (e.g., or some other suitable network entity) may configure the number of beams L, the number of antenna ports 205 in a first and second direction ($N_1$, $N_2$), and the oversampling ratio for each direction ($O_1$, $O_2$). For example, the number of antenna ports 205 and the oversampling ratio may be configured in the case that CSI-RS 215 is not beamformed (e.g., but may not be used in the case of beamformed CSI-RS 215, which may only require a configuration of the number of beams/antenna ports L). The feedback payload for the linear combination codebook may in some cases include 2L sets of coefficients for each spatial layer (e.g., for L beams each with 2 polarizations). For example, the report may include the wideband beam amplitude, subband beam amplitude, and subband beam phase of 2L−1 coefficients along with the beam index.

The coefficients may be quantized to reduce signaling overhead. Accordingly, the wideband amplitude may be signaled using three (3) bits per coefficient (i.e., 3×(2L−1) bits in total) to indicate one of the eight (8) quantized levels in the finite set above. Similarly, the subband beam amplitude may be signaled using one (1) bit per coefficient per subband for the strongest K−1 coefficients out of the 2L−1 coefficients (i.e., and zero (0) bits for the remaining 2L−K coefficients) for a total of K−1 bits per subband. In one example: when L=2, K=4; when L=3, K=4; and when L=4, K=6. The subband beam phase may include two (2) or three (3) bits per coefficient per subband (i.e., depending on which finite set is used).

By way of example, the rank 1 payload for a CSI report with $N_1=N_2=O_1=O_2=4$ and ten subbands may be given by:

TABLE 1

| | | | Rank 1 Payload (in bits) | | | | | |
|---|---|---|---|---|---|---|---|---|
| L | Rotation: $\lceil \log_2(O_1 O_2) \rceil$ | L-beam selection $\left\lceil \log_2 \binom{N_1 N_2}{L} \right\rceil$ | Strongest coefficient: $\lceil \log_2 2L \rceil$ per layer | WB amp: | Total WB payload | SB amp: | SB phase: | Total payload |
| 2 | 4 | 7 | 2 | 9 | 22 | 3 | 9 | 142 |
| 3 | 4 | 10 | 3 | 15 | 32 | 3 | 13 | 192 |
| 4 | 4 | 11 | 3 | 21 | 39 | 5 | 19 | 279 |

As can be seen from Table 1, the payload of CSI report increases dramatically as the number of beams L increases. However, beams with zero power (e.g., $p_{r,l,i}^{WB}$ effectively zero or less than some threshold) may not contribute to the final precoder (e.g., the final precoder may be formed by the L' beams (L'<L) with $p_{r,l,i}^{WB}$ greater than the threshold). Accordingly, the payload of the CSI report may be reduced in accordance with the described techniques by removing the bits corresponding to the coefficients of zero-power beams (e.g., including information indicating which beams are zero-power and which beams are non-zero-power). That is, because a zero-power beam does not contribute (e.g., significantly or at all) to the final precoder, the wideband amplitude, subband amplitude, and subband phase of the zero-power beam(s) may be omitted from the CSI report.

For example, if the network (e.g., base station 105-$a$) is aware of the existence of zero-power beams, UE 115-$a$ can report the wideband amplitude, subband amplitude, and subband phase as if there are L' beams to be used in the linear combination codebook. That is, if L=4 and there is one zero-power beam, the feedback payload size for the rank 1 (i.e., one spatial layer) report may be reduced from 279 bits to 192 bits (e.g., along with a relatively small number of bits to indicate the presence of the zero-power beam as described further below). Further, the more zero-power beams and the higher the rank of the feedback, the more the overhead can be reduced.

Aspects of the present disclosure relate to linear combination codebooks (e.g., Type II codebooks). For example, a Type II codebook may use non-precoded CSI-RS 215 while a Type II port selection codebook may use precoded CSI-RS 215. UE 115-$a$ may receive a configuration indicating use of the Type I codebook and may identify a combination of beams to be communicated to base station 105-$a$ in a CSI report based on the non-precoded CSI-RS 215. Alternatively, UE 115-$a$ may receive a configuration indicating use of the Type II port selection codebook and may identify a combination of antenna ports 205 to be communicated to base station 105-*a* in the CSI report based on the precoded CSI-RS 215. That is, because the CSI-RS 215 are precoded, each antenna port 205 may correspond to a respective beam, and UE 115-*a* may use the one-to-one correspondence between antenna ports 205 and beams to perform channel estimation. Thus, in aspects of the present disclosure a number of beams may be used to refer to a number of beams in conjunction with a Type 11 codebook and/or a number of antenna ports in conjunction with a Type II port selection codebook.

Figure 3:
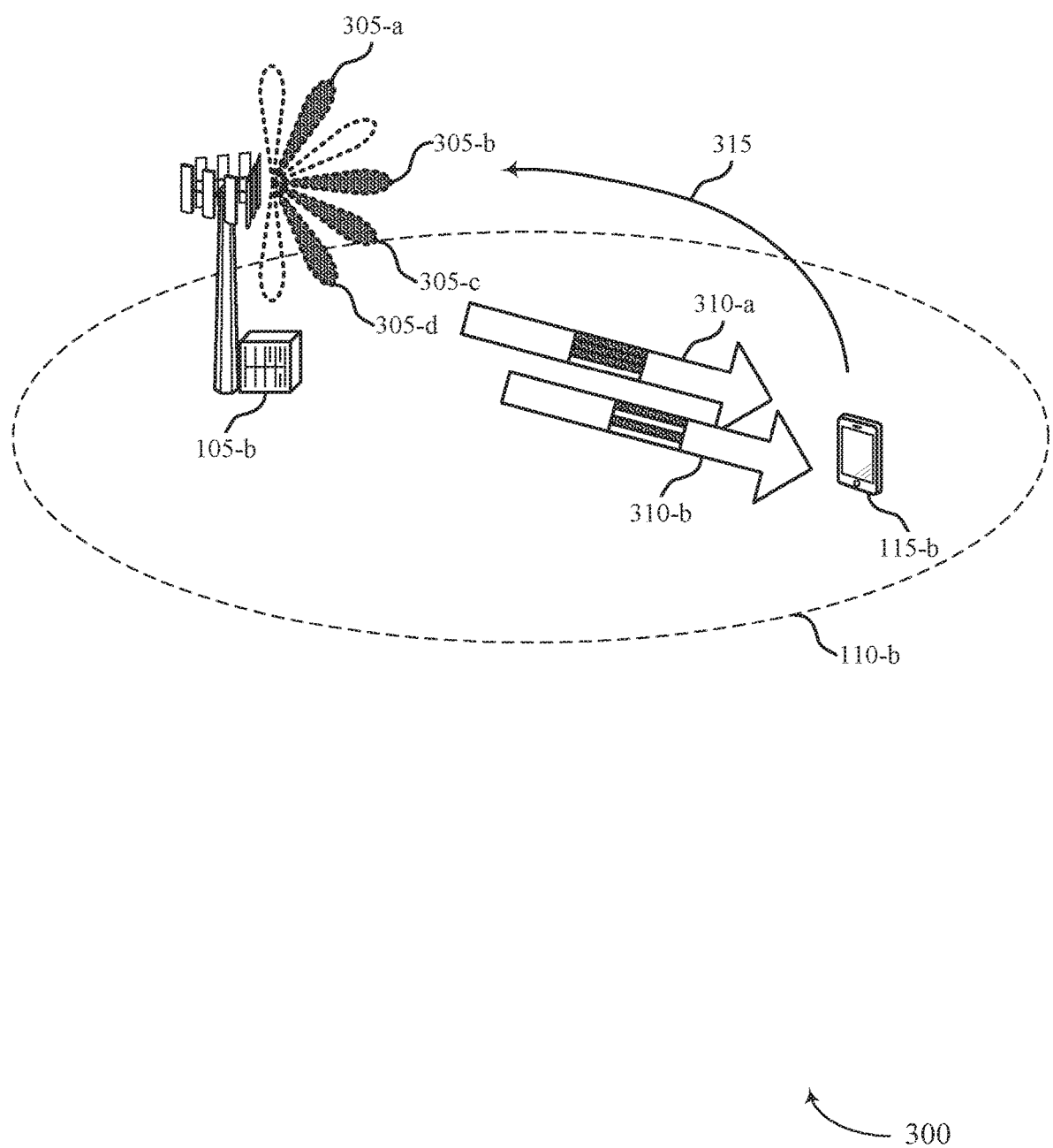

FIG. 3 illustrates an example of a wireless communications system 300 that supports techniques for non-zero-power beams in accordance with various aspects of the present disclosure. Wireless communications system 300 includes a base station 105-*b* and a UE 115-*b*, each of which may be an example of the corresponding devices as described with reference to FIGS. 1 and 2. Wireless communications system 300 may operate in frequency ranges that are associated with beamformed transmissions between base station 105-*b* and UE 115-*b* (e.g., mmW frequency ranges, sub-6 GHz frequency ranges, etc.).

In aspects of the present disclosure, signal processing techniques such as beamforming may be used to combine energy coherently and overcome path losses. By way of example, base station 105-*b* may contain multiple antennas. In some cases, each antenna may transmit (or receive) a phase-shifted version of a signal such that the phase-shifted versions constructively interfere in certain regions and destructively interfere in others. Weights may be applied to the various phase-shifted versions, e.g., in order to steer the transmissions in a desired direction. Such techniques (or similar techniques) may serve to increase the coverage area 110-*b* of the base station 105-*b* or otherwise benefit wireless communications system 300.

Transmit beams 305 represent examples of beams over which data (e.g., or control information) may be transmitted. Accordingly, each transmit beam 305 may be directed from base station 105-*b* toward a different region of the coverage area 110-*b* and in some cases, two or more beams may overlap. Transmit beams 305 may be transmitted simultaneously or at different times. In either case, a UE 115-*b* may be capable of receiving the information in one or more transmit beams 305 via receive beams. In some cases, each receive beam may correspond to a given transmit beam 305 (e.g., or antenna port in the case of precoded signals), or a receive beam may correspond to multiple transmit beams 305 (e.g., UE 115-*b* may receive a signal sent over multiple transmit beams 305 in a transmit diversity scheme).

As described above, MIMO operations may be supported through transmission of CSI-RS over transmit beams 305. Base station 105-*b* is illustrated with seven (7) transmit beams 305, though any suitable number of transmit beams may be employed. In aspects, each transmit beam 305 may be resolved into polarized component beams. That is, base station 105-*b* may have an antenna array (e.g., a one-dimensional or two-dimensional array) constructed from multiple dual-polarized antenna elements, where transmit beams are formed by phase control of antenna elements and each beam may correspond to an antenna port. The polarized components of a given transmit beam 305 may be treated independently or collectively. Base station 105-*b* may configure UE 115-*b* to identify a subset of the transmit beams 305 to be used for a linear combination codebook.

Aspects of the present disclosure may be described in the context of sets of antenna ports, where each antenna port may steer or otherwise control one or more antenna elements (e.g., as described with reference to FIG. 2). In some cases, a first set of antenna ports may be associated with a first polarization of dual-polarized antenna elements of a first antenna array while a second set of antenna ports may be associated with a second polarization of the dual-polarized antenna elements of the first antenna array. Additionally or alternatively, the second set of antenna ports may be associated with a second antenna array (e.g., that supports the first polarization or the second polarization, or both the first and second polarizations). Thus, different sets of antenna ports may refer to antenna ports having different polarizations and/or antenna ports associated with different antenna arrays (e.g., antenna panels). That is, base station 105-*b* (e.g., and/or UE 115-*b*) may include multiple antenna arrays (e.g., antenna panels), and aspects of the present disclosure may support non-zero-power beam indication per array, non-zero-power beam indication per polarization, or both.

The precoders used to form transmit beams 305 may be selected from a codebook (e.g., which may be known to base station 105-*b* and UE 115-*b*). That is, each transmit beam 305 may be formed based on beamforming parameters contained in a codebook. Alternatively, the precoder may be based on a non-codebook method (e.g., may be based on an uplink sounding reference signal via beam reciprocity). In each case, the precoder may be transparent to UE 115-*b* (e.g., UE 115-*b* may only estimate the composite channel without knowledge of the exact precoder used to form the transmit beam 305). Each transmit beam 305 may carry a CSI-RS sequence. Upon receiving the CSI-RS, UE 115-*b* may estimate the channel (e.g., H*b) for the transmit beam 305 based on the CSI-RS. The UE 115-*b* may test one or more receive beams for each of the transmit beams 305 to identify transmit/receive beam pairs providing the best channel conditions for communication. That is, UE 115-*b* may estimate the beamformed (e.g., composite) channel for a plurality of transmit/receive beam pairs (e.g., rather than or in addition to the non-beamformed channel as described with reference to FIG. 2).

Aspects of the techniques described with reference to FIG. 2 may apply to beamformed CSI-RS as well. For example, for each spatial layer 310, UE 115-*a* may report CSI feedback indicating a linear combination of beams and/or antenna ports. For example, base station 105-*b* may configure UE 115-*b* to report CSI feedback for L transmit beams 305 (e.g., corresponding to L antenna ports). Accordingly, UE 115-*b* may transmit a CSI report 315 which includes an indication of the L selected antenna ports (e.g., a port selection matrix) as well as the beam coefficients used to combine them. In some cases, the weights (e.g., beam coefficients) may be polarization-specific and/or spatial layer 310-specific. The L reported antenna ports may in some cases be common to all polarizations and all spatial layers 310. The non-zero-power beam indication may be polarization-specific and/or spatial layer-specific (e.g., or may be common to all polarizations and spatial layers 310). As described above, the beam coefficients (e.g., the wideband beam amplitude, the subband beam amplitude, and the subband beam phase) may each be drawn from a respective finite set.

As further described above, the payload of the CSI report 315 increases dramatically as the number of beams L increases. However, because beams with zero power (e.g., $p_{r,l,i}^{WB}$ less than some threshold) may not contribute to the final precoder (e.g., the final precoder may be formed by the L' beams (L'<L) with $p_{r,l,i}^{WB}$ above the threshold), the payload of the CSI report 315 may be reduced by removing the bits corresponding to the coefficients of zero-power beams (e.g., and instead including an indicator of non-zero-power beams).

Various formats for the payload of the CSI report 315 are considered below. Aspects of these formats may be combined such that the examples discussed below are not limiting of scope. Aspects of the following are described using L=4 (e.g., base station 105-*b* may configure UE 115-*b* to report feedback for four transmit beams 305) and rank 2 (e.g., the four transmit beams 305 form two spatial layers 310-*a*, 310-*b* when received by UE 115-*b*). It is to be understood that the described concepts may be applied to any suitable L and rank. Additionally, various aspects of the described formats may be applicable to both beamformed CSI-RS and non-beamformed CSI-RS.

In the following examples, the contribution of each transmit beam 305 to a given precoding vector is identified over two polarizations, though the described concepts apply to single polarization transmissions as well. Based on a configuration received from base station 105-*b*, UE 115-*b* reports CSI based on four transmit beams 305 (e.g., L=4). UE 115-*b* may select transmit beams 305-*a*, 305-*b*, 305-*c*, and 305-*d* for the two spatial layers 310-*a*, 310-*b*. For example, UE 115-*b* may select the L beams based on the received power for the beamformed CSI-RS, the relative contributions to the precoding vector for one or more spatial layers 310, etc. Alternatively (e.g., if the CSI-RS is not beamformed), UE 115-*b* may emulate a DFT codebook (e.g., may evaluate candidates from the codebook in order to find the L beams which match the channel). In yet other examples, UE 115-*b* may select the L beams based on a spectral efficiency for some or all possible precoders. For example, UE 115-*b* may emulate all possible precoders formed by the possible combinations (e.g., amplitude factors and phase factors) of antenna ports or transmit beams 305 (e.g., for both precoded CSI-RS and non-precoded CSI-RS). Accordingly, UE 115-*b* may select the L beams which match the channel estimates.

In some cases, UE 115-*b* (e.g., and/or base station 105-*b*) may identify a triggering condition for including a non-zero-power beam indicator in a CSI report. For example, the triggering condition may be included in the configuration indicating the number of beams to be reported in the CSI report 315. For example, the triggering condition may include a communication quality (e.g., an SNR, supported rank, etc.), a device capability (e.g., a battery level), a network condition (e.g., a number of communicating devices), a configuration setting, etc. UE 115-*b* (e.g., and/or base station 105-*b*) may determine whether the triggering condition is satisfied (e.g., whether the communication quality exceeds a certain threshold) and determine a format of the CSI report 315 based on the triggering condition satisfying the threshold or failing to satisfy the threshold. As an example, UE 115-*b* may default to including the non-zero-power beam indicator, but may in some cases identify a triggering condition and adjust the format of the CSI report 315 to include beam coefficients for all beams/antenna ports (e.g., including zero-power beams). Accordingly, UE 115-*b* may switch (e.g., dynamically or semi-statically) between using a non-zero-power beam indicator and omitting the non-zero-power beam indicator in a CSI report 315. In some cases, a format of the indicator in the CSI report 315 may be based at least in part on the triggering condition. In some cases, the format of the CSI report 315 (e.g., the reporting setting) may be fixed. Alternatively, the reporting setting may be dynamically updated (e.g., configured by the network based on the triggering condition).

The contribution of transmit beams 305 to a final precoding vector for a given spatial layer 310 may vary (e.g., due to channel characteristics such as obstacles, fading, interference, etc.). For example, there may be variance between different transmit beams 305 for a given spatial layer or for the same transmit beam 305 across different spatial layers and/or polarizations. UE 115-*b* may evaluate transmit beams 305 (e.g., for each polarization and/or spatial layer 310).

For example, UE 115-*b* may compare the contribution of each transmit beam 305 to a threshold (e.g., a wideband amplitude factor). The comparisons may be spatial layer specific, specific to a set of antenna ports, and/or polarization specific. UE 115-*b* may identify the subset of transmit beams 305 to be included in the CSI report and (e.g., based on the comparison) may classify transmit beams 305 as zero-power beams (e.g., for beams with a wideband amplitude factor below the threshold) or non-zero-power beams (e.g., for beams with a wideband amplitude factor above the threshold).

By way of example, the contribution of transmit beam 305-*a* to the final precoding matrix may be greater than the threshold for both sets of antenna ports for spatial layer 310-*a* and spatial layer 310-*b*. In some cases, the contributions of a transmit beam 305 to the final precoding matrix may be compared to polarization-specific and/or layer-specific thresholds. The contribution of transmit beam 305-*b* to the final precoding matrix may be greater than the threshold for both sets of antenna ports for spatial layer 310-*a* and lower than the threshold for both sets of antenna ports for spatial layer 310-*b* (i.e., may be a zero-power beam for spatial layer 310-*b*). The contribution of transmit beam 305-*c* to the final precoding matrix may be greater than the threshold over one set of antenna ports of spatial layer 310-*a* (e.g., but the contribution of transmit beam 305-*c* for a second set of antenna ports of spatial layer 310-*a* may be below the threshold). Similarly, the contribution of transmit beam 305-*c* to the final precoding matrix for spatial layer 310-*b* may be greater than the threshold over the second set of antenna ports (e.g., but lower than the threshold for the first set of antenna ports). Transmit beam 305-*d* may represent a zero-power beam for both spatial layers 310-*a*, 310-*b* (e.g., its contribution to the final precoding matrices may be below the threshold over both sets of antenna ports for spatial layer 310-*a* and spatial layer 310-*b*).

For the sake of illustration, four (4) transmit beams 305 are labeled in FIG. 3. However, it should be understood that the base station 105-*b* may transmit additional beams (e.g., non-shaded beams 305). These beams may also be received, for example, with respective beamforming contributions below the threshold over both sets of antenna ports and spatial layers 310. It is to be understood that each spatial layer 310 may contain transmit beams 305 of multiple polarizations. Spatial layers 310-*a* and 310-*b* are illustrated as being formed by linear combinations of four transmit beams 305 for a given set of antenna ports (e.g., the first set of antenna ports described above). Accordingly, the final precoding matrix for the first set of antenna ports (e.g., which may be associated with a first polarization) of spatial layer 310-*a* has non-zero contributions from three transmit beams 305 (e.g., corresponding to transmit beams 305-*a*, 305-*b*, and 305-*c*, which are indicated as shaded boxes in spatial layer 310-*a*) and one zero-power transmit beam 305 (e.g., corresponding to transmit beam 305-*d*, which is indicated as an unshaded box in spatial layer 310-*a*). Similarly, the final precoding matrix for the first set of antenna ports of spatial layer 310-*b* has non-zero contributions from transmit beams 305-*a* and 305-*c* and two zero-power transmit beams 305 (e.g., corresponding to transmit beams 305-b and 305-d). In some cases, the first set of antenna ports may be associated with a first polarization. It is to be understood that these illustrations are included for explanation only (e.g., such that polarization-specific contributions or contributions specific to a given set of antenna ports for the precoding matrices may not be computed in all reporting settings described below).

In a first reporting setting, UE 115-b may report the number of non-zero-power beams applied to all sets of antenna ports and layers. As described above, transmit beam 305-d represents an example of a zero-power beam for both sets of antenna ports and both spatial layers 310 (e.g., because its wideband amplitude factor may be zero or below a threshold after spectral efficiency evaluation, as described above). In accordance with the described techniques, UE 115-b may therefore include an indication of three non-zero-power beams applying to both sets of antenna ports and both spatial layers. In some cases, UE 115-b may convey the indication using $\lceil \log_2 L \rceil$ bits (e.g., because the possible values of the number of non-zero-power beams for a given layer are 0, 1, 2, ..., L−1). In such an approach, the format of the report depends on the configuration of L. Alternatively, UE 115-b may convey the indication using $\lceil \log_2 L_{max} \rceil$ bits, where $L_{max}$ is the maximal possible value of L for the network (e.g., such that each CSI report 315 has the same format regardless of the configuration of L for a given UE 115). In the present example, UE 115-b indicates to base station 105-b that one of the four beams is a zero-power beam for all sets of antenna ports and spatial layers 310.

In aspects, the CSI report 315 of the present example may indicate that only one transmit beam (e.g., transmit beam 305-a) is a non-zero-power beam (e.g., because the contribution of the other three transmit beams 305 to the final precoding vector of one or both spatial layers 310 is relatively low). The threshold may be statically, semi-statically, or dynamically configured (e.g., by a network entity such as base station 105-b) or may be autonomously determined by UE 115-b (e.g., based on a factor applied to the highest power transmit beam 305). As an example, if $N_1$=4, $N_2$=4, and L=4, and UE 115-b determines that there are two (2) non-zero-power beams, it may use two (2) bits to indicate the number of non-zero-power beams or may use $\lceil \log_2 4 \times 4 \rceil$ bits. Additionally, the CSI report 315 may include beam coefficients (e.g., as well as a strongest coefficient indication). Accordingly, CSI report 315 may be transmitted with a payload size as if L=2 and K=4 (i.e., rather than L=4 and K=6).

In some examples of the first reporting setting, UE 115-b may convey the number and indices of non-zero-power beams (e.g., the indices relative to the L beams rather than the absolute beam index corresponding to a beam position in the beam set) applied to all sets of antenna ports (e.g., polarizations) and spatial layers 310 in CSI report 315 using an L-bit bitmap. For example, $b_0, b_1, \ldots, b_{L-1}$ may be the indication for the L beams, and $b_i$=0 means that the power of beam i (e.g., where i corresponds to the index relative to the L beams) on all sets of antenna ports and spatial layers 210 is zero (i.e., $p_{0,l,i}^{WB} = p_{1,l,i}^{WB} = 0, \forall l = 0, 1, \ldots R−1$, where R is the selected rank). Accordingly, $b_i$ may be an example of a power indicator bit (e.g., such that the value of $b_i$ indicates whether a given beam has zero-power or non-zero-power). After determining the bitmap, UE 115-b may report beam indices of the non-zero-power beams (e.g., but may not report indices of the zero-power beams). The beam coefficients included in CSI report 315 may then correspond to the indicated non-zero-power beams. As an example, for L=4, UE 115-b may include in the CSI report 315 four (4) beam indices (e.g., [4, 7, 9, 13]). CSI report 315 may include a non-zero-power beam indication (e.g., '0101'), indicating that the beams with indices 4 and 9 are zero power beams for all spatial layers 310 and sets of antenna ports while the beams with indices 7 and 13 are non-zero-power beams for all spatial layers 310 and sets of antenna ports. CSI report 315 may include beam coefficients corresponding to the beams with indices 7 and 13 (e.g., where the beam coefficients may in some cases be specific to a given set of antenna ports and/or spatial layer specific). Alternatively, in some cases (e.g., based on a triggering condition), UE 115-b may include beam indices of all the L beams (i.e., where the beam indices correspond to the absolute beam position in the set of transmit beams 305).

In a second reporting setting, UE 115-b may report non-zero-power beams that are specific to a given set of antenna ports (e.g., applied to all spatial layers 310). For example, UE 115-b may report the number of non-zero-power beams per set of antenna ports, where each set of antenna ports may be associated with a different polarization, a different antenna array, or both. The possible values of the number of non-zero-power beams per set of antenna ports are 0, 1, 2, ..., L−1. Similarly to the first reporting setting, UE 115-b may convey the indication using $2 \times \lceil \log_2 L \rceil$ bits or $2 \times \lceil \log_2 L_{max} \rceil$ bits. In the former case, the first $\lceil \log_2 L \rceil$ bits may be used for the first set of antenna ports while the remaining bits may be used for the second set of antenna ports. Accordingly, in the present example, UE 115-b may inform the network (e.g., or base station 105-b) that, for the first and second sets of antenna ports, there is one non-zero-power beam for each spatial layer 310-a, 310-b (e.g., transmit beam 305-a). If the contribution of transmit beam 305-b, 305-c to a precoding matrix for a given spatial layer 310 and a given set of antenna ports exceeds a threshold (e.g., which may be configured or autonomously determined as described above), these beams may be considered non-zero-power beams for that set of antenna ports (e.g., regardless of the contribution of the transmit beam 305 on the given set of antenna ports for the other spatial layers 310).

Alternatively, in the second reporting setting UE 115-b may convey the number and indices (e.g., indices relative to the L identified beams) of non-zero-power beams per set of antenna ports in CSI report 315 using a 2L-bit bitmap. In this example, $b_0, b_1, \ldots, b_{L-1}$ may be used for the first set of antenna ports and $b_L, b_{L+1}, \ldots, b_{2L-1}$ may be used for the second set of antenna ports. Accordingly, $b_v$=0 means that the power of beam i=mod(v, L) for antenna port set $$r = \left\lfloor \frac{v}{L} \right\rfloor + 1$$

is zero $$\left( \text{i.e., } p_{\lfloor \frac{v}{L} \rfloor+1, l, mod(v,L)}^{WB} = 0, \forall l = 0, 1, \ldots, R-1 \right).$$

As an example, for L=4, UE 115-b may include in the CSI report 315 four (4) beam indices (e.g., [4, 7, 9, 13]). CSI report 315 may include a non-zero-power beam indication (e.g., '01010011'), indicating that, for the first set of antenna ports, the beams with indices 4 and 9 are zero power beams for all spatial layers 310 while the beams with indices 7 and 13 are non-zero-power beams for all spatial layers 310 and, for the second set of antenna ports, the beams with indices 4 and 7 are zero power beams for all spatial layers 310 while the beams with indices 9 and 13 are non-zero-power beams for all spatial layers 310. CSI report 315 may include beam coefficients corresponding to the non-zero power beams (e.g., beams with indices 7 and 13 for the first set of antenna ports and beam coefficients corresponding to the beams with indices 11 and 13 for the second set of antenna ports).

In a third reporting setting, UE 115-*b* may report layer-specific non-zero-power beams (e.g., applied to one or more sets of antenna ports). For example, UE 115-*b* may report the number of non-zero-power beams per spatial layer 310. The possible values of the number of non-zero-power beams per spatial layer 310 are 0, 1, 2, . . . , L−1. Accordingly, UE 115-*b* may convey the indication using R×⌈log₂ L⌉ bits where the first ⌈log₂ L⌉ bits are for the spatial layer 310-*a* and the remaining ⌈log₂ L⌉ are for spatial layer 310-*b*. Alternatively, UE 115-*b* may convey the indication using R×⌈log₂ L_{max}⌉ bits. In the present example, UE 115-*b* may indicate that spatial layer 310-*a* includes two out of four (e.g., the maximum number of non-zero-power beams for reporting) non-zero-power beams (e.g., the two non-zero-power beams are the same for both polarizations). In this example, the two beams correspond to transmit beams 305-*a*, 305-*b*. Similarly, UE 115-*b* may indicate that spatial layer 310-*b* includes one out of four non-zero-power beams (e.g., transmit beam 305-*a*). As with the first two reporting settings, UE 115-*b* may decide whether to include a beam i associated with zero-power on layer 1 for a first set of antenna ports while it is associated with non-zero-power on layer 1 of a second set of antenna ports (e.g., based on a threshold comparison). For example, transmit beam 305-*c*, which contributes to the final precoding matrix on each spatial layer 310 over only one set of antenna ports, may be indicated as a zero-power beam or a non-zero-power beam based on a threshold comparison. If the contribution of transmit beam 305-*c* on spatial layer 310-*a* for the first set of antenna ports exceeds the threshold, transmit beam 305-*c* may not be considered a zero-power beam for spatial layer 310-*a*, and the CSI report 315 may indicate that spatial layer 310-*a* includes three out of four non-zero-power beams.

Alternatively, in the third reporting setting UE 115-*b* may convey the number and indices of non-zero-power beams per spatial layer 310 in CSI report 315 using a R×L-bit bitmap. In this example, $b_0, b_1, \ldots, b_{L-1}$ are for the first layer, $b_L, b_{L+1}, \ldots, b_{2L-1}$ are for the second layer, etc. and $b_v = 0$ means that the power of beam i=mod(v,L) with the layer $$l = \left\lfloor \frac{v}{L} \right\rfloor + 1 \text{ is zero } \left(\text{i.e., } p^{WB}_{0, \lfloor \frac{v}{L} \rfloor + 1, mod(v,L)} = p^{WB}_{1, \lfloor \frac{v}{L} \rfloor + 1, mod(v,L)} = 0 \right).$$

In a fourth reporting setting, UE 115-*b* may report layer and antenna port set-specific non-zero-power beams. For example, UE 115-*b* may report the number of non-zero-power beams per spatial layer 310 per set of antenna ports. Accordingly, UE 115-*b* may use 2R×⌈log₂ L⌉ bits to indicate the number of non-zero-power beams or 2R×⌈log₂ L_{max}⌉ bits. In such a reporting setting, UE 115-*b* can indicate to base station 105-*b* the number of non-zero-power beams for a given layer-antenna port set pair.

Alternatively, in the fourth reporting setting UE 115-*b* may convey the number and indices of non-zero-power beams per layer-antenna port set pair using a 2R×L-bit bitmap in which $b_0, b_1, \ldots, b_{L-1}$ are for the first set of antenna ports of spatial layer 310-*a*; $b_L, b_{L+1}, \ldots, b_{2L-1}$ are for the second set of antenna ports of spatial layer 310-*a*, $b_{2L}, b_{2L+1}, \ldots, b_{2L-1}$ are for the first set of antenna ports of spatial layer 310-*b*, and $b_3, b_{3L+1}, \ldots, b_{4L-1}$ are for the second set of antenna ports of spatial layer 310-*b*. In this example, $b_v = 0$ indicates that the power of beam i=mod(v, L) for the $$\text{mod}\left(\left\lfloor \frac{v}{L} \right\rfloor, 2\right)$$

of layer $$l = \left\lfloor \frac{v}{2L} \right\rfloor$$

is zero $$\left(\text{i.e., } p^{WB}_{mod(\lfloor \frac{v}{L} \rfloor, 2), \lfloor \frac{v}{L} \rfloor, mod(v,L)} = 0\right).$$

In a fifth reporting setting, UE 115-*b* may report a number of zero-power beams and the number of non-zero-power beams (e.g., per-layer, per-polarization, per-antenna port set). The number of non-zero-power beams may be determined from the total number of beams (e.g., per-layer, per-polarization, per-antenna port set) and the reported number of zero-power beams. For example, UE 115-*b* may convey the number and indices of zero-power beams (e.g., the indices relative to the L beams rather than the absolute beam index corresponding to a beam position in the beam set) applied to all sets of antenna ports (e.g., polarizations) and spatial layers 310 in CSI report 315 using an L-bit bitmap, and the number and indices of non-zero-power beams may be determined from the set of beams and the indices of the zero-power beams.

In some cases, UE 115-*b* may be configured (e.g., by base station 105-*b* or some other suitable network entity) to use a given reporting setting for CSI report 315. For example, the configuration may be received via RRC signaling or other downlink control signaling. In some cases, UE 115-*b* may identify a triggering condition for a given reporting setting for CSI report 315 (e.g., as described above). For example, UE 115-*b* may default to reporting using a non-zero-power beam indication (e.g., using one of the reporting settings described above). In such an example, there may not be any signaling from the network to trigger the non-zero-power beam indication. Additionally or alternatively, UE 115-*b* may identify a condition (e.g., or may be signaled by the network) such that the non-zero-power beam indication is not used for CSI report 315. In such an example, UE 115-*b* may report beam coefficients for all beams in CSI report 315 (e.g., including beams whose contribution to the final precoding vector is relatively low). Accordingly, in some cases a UE 115-*b* may dynamically or semi-statically switch between CSI report 315 formats (e.g., based on some triggering condition or network signaling).

Additionally or alternatively, various possible reporting encoding schemes for generating CSI report 315 are considered within the scope of the present disclosure. In some cases, UE 115-*b* may jointly encode the indicator of the number of zero-power beams with the rank indication (RI).

For example, the payload for the indicator may be directly cascaded with the payload of the RI (e.g., using $\lceil \log_2 \text{rank}_{max} \rceil + \lceil \log_2 L_{max} \rceil$ bits). Alternatively, the RI and indicator may be jointly quantized based on a lookup table. An example lookup table is provided below in which the total number of bits for the jointly quantized payload is four (4). Alternatively, in some examples, the RI and indicator may be separately encoded and transmitted in separate control fields or messages.

TABLE 2

Example Lookup Table

| L' | 1 | 2 | 3 | 4 | 5 | 6 | 7 | 8 |
|---|---|---|---|---|---|---|---|---|
| Rank | 1-2 | 1-2 | 3-4 | 3-4 | 5-6 | 5-6 | 7-8 | 7-8 |

Figure 4:
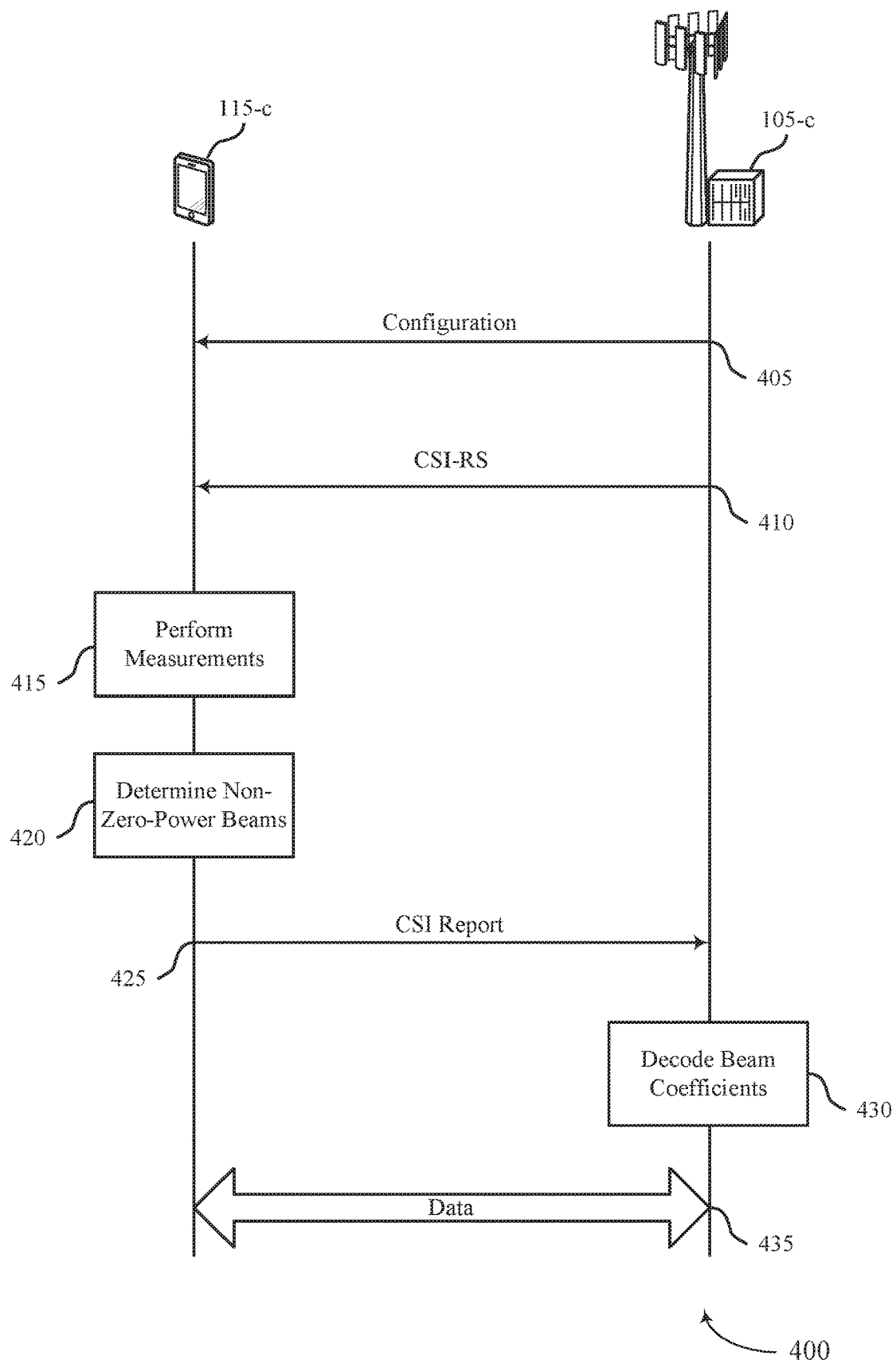
FIG. 4 illustrates an example of a process flow that supports techniques for non-zero-power beams in wireless systems in accordance with aspects of the present disclosure.

FIG. 4 illustrates an example of a process flow 400 that supports techniques for non-zero-power beams in accordance with various aspects of the present disclosure. Process flow 400 includes a base station 105-c and a UE 115-c, each of which may be an example of the corresponding devices as described with reference to FIGS. 1 through 3.

At 405, base station 105-c (e.g., or some other suitable network entity) may transmit a configuration to UE 115-c. The configuration may include a number of beams (e.g. or antenna ports) to be included in a CSI report (e.g., a number of beams/ports to be used for linear combination). In some cases (e.g., when CSI-RS is not precoded), the configuration may include a number of CSI-RS ports per polarization in the horizontal direction and the vertical direction. In other cases (e.g., when CSI-RS is precoded), the configuration may include a number of CSI-RS ports per polarization. In some cases (e.g., when CSI-RS is not precoded), the configuration may further include an oversampling ratio for the CSI-RS ports in the horizontal direction and the vertical direction. In some cases, the configuration may include a CSI report setting (e.g., which may indicate one of the reporting settings described above with reference to FIG. 3), a CSI resource setting, or any combination thereof. The configuration may be transmitted via RRC signaling or downlink control signaling. In some cases, the configuration indicates a format of a CSI report (e.g., corresponding to a reporting setting as described with reference to FIG. 3). UE 115-c may in some cases determine that a non-zero-power beam indicator is triggered based at least in part on the format of the CSI report.

At 410, UE 115-c may receive CSI-RS transmitted by base station 105-c. The CSI-RS may include a set of CSI-RS transmitted over multiple antenna ports, where the CSI-RS may be precoded or non-precoded. Each antenna port may be associated with one or more polarizations.

At 415, UE 115-c may perform channel measurements based at least in part on the CSI-RS. For example, UE 115-c may estimate a communication channel based on the CSI-RS (e.g., may estimate frequency-fading characteristics, multi-path availability, etc.). Based on the channel measurements, UE 115-c may identify relevant CSI parameters for one or more spatial layers.

At 420, UE 115-c may determine the number of non-zero-power beams and/or antenna ports and their indices based on the derived CSI parameters (e.g., may compare beams to a threshold). In some cases the non-zero-power beams may be identified based at least in part on the configuration received at 405. Table 3 illustrates an example beam classification scheme. In this example, four beams are transmitted (indexed 0 through 3). The contribution (e.g., wideband amplitude) of each beam over each of two spatial layers is determined for a first set of antenna ports and a second set of antenna ports. Based on comparing the wideband amplitude factor to a threshold ($\sqrt{0.1}$ in the present example), UE 115-c determines a power indicator bit to be included in a CS report. Accordingly, the present example may represent aspects of the fourth reporting setting described above (e.g., reporting layer and antenna port set-specific non-zero-power beams using a bitmap comprising power indicator bits), though the described techniques may be extended to the other reporting settings. As shown, the layer and antenna port set-specific beams may be classified as zero power (e.g., indicated by a power indicator bit of '0') or non-zero-power (e.g., indicated by a power indictor bit of '1') based on comparing the wideband amplitude to a threshold.

TABLE 3

Beam Classification

| Beam Index | Spatial Layer | Polarization | Wideband Amplitude Factor | Power Indicator Bit |
|---|---|---|---|---|
| 0 | A | 1 | $\sqrt{0.0625}$ | 0 |
|   |   | 2 | $\sqrt{0.25}$ | 1 |
|   | B | 1 | $\sqrt{0.0625}$ | 0 |
|   |   | 2 | $\sqrt{0.0313}$ | 0 |
| 1 | A | 1 | 1 | 1 |
|   |   | 2 | $\sqrt{0.5}$ | 1 |
|   | B | 1 | $\sqrt{0.0156}$ | 0 |
|   |   | 2 | $\sqrt{0.125}$ | 1 |
| 2 | A | 1 | $\sqrt{0.5}$ | 1 |
|   |   | 2 | $\sqrt{0.5}$ | 1 |
|   | B | 1 | 1 | 1 |
|   |   | 2 | 1 | 1 |
| 3 | A | 1 | $\sqrt{0.0625}$ | 0 |
|   |   | 2 | $\sqrt{0.0313}$ | 0 |
|   | B | 1 | 0 | 0 |
|   |   | 2 | $\sqrt{0.0313}$ | 0 |

At 425, UE 115-c may transmit a CSI report (e.g., according to the configuration received at 405). The CSI report may include a non-zero-power beam indication, RI, non-zero-power beam selection (e.g., an index of each beam where the index corresponds to a beam position in the precoded CSI-RS beam set), beam coefficients associated with the non-zero-power beams, or a combination thereof. In some cases, the non-zero-power beam indication and RI may be jointly encoded. For example, jointly encoding the RI and indicator may include directly cascading the payload of the RI and the indicator or may include jointly quantizing the RI and the indicator. In the case that the RI and indicator are jointly quantized, the payload may be based at least in part on a subsampling of at least one of the RI or the indicator or may be based on a lookup table of a combination of the RI and the indicator (e.g., Table 2). Alternatively, RI and the indicator may be separately encoded as described above. In some cases, the number of bits in the non-zero-power beam indicator may be fixed or may depend on the number of beams indicated for CSI-RS reporting. In some cases, the beam coefficients for each non-zero-power beam of the subset comprise a wideband beam amplitude, a subband beam amplitude, a subband beam phase, or a combination thereof. In some cases, the non-zero-power beam selection (e.g., beam index) and the beam coefficients (i.e., wideband power, subband power, and subband phase) may be jointly encoded. Various formats for the CSI report are described with reference to the reporting settings of FIG. 3.

At 430, base station 105-c may decode the CSI report. For example, base station 105-c may first decode the RI and non-zero-power beam indicator. Based on the non-zero-power beam indicator, base station 105-c may determine the payload size of the CSI report. Subsequently, base station 105-c may decode the beam selection and coefficients for the non-zero-power beams.

At 435, base station 105-c may transmit a downlink data transmission to UE 115-c using the beam configuration indicated in the CSI report. Various uses for the CSI report received at 425 are considered within the scope of the present disclosure. For example, the CSI report may allow the network (e.g., base station 105-c) to learn about a communication channel. After obtaining the report, base station 105-c may use the information for scheduling, multi-user pairing, multi-user precoder calculation, etc. In some cases, the network may transmit data to UE 115-c without basing the transmission on the CSI report.

Figure 5:
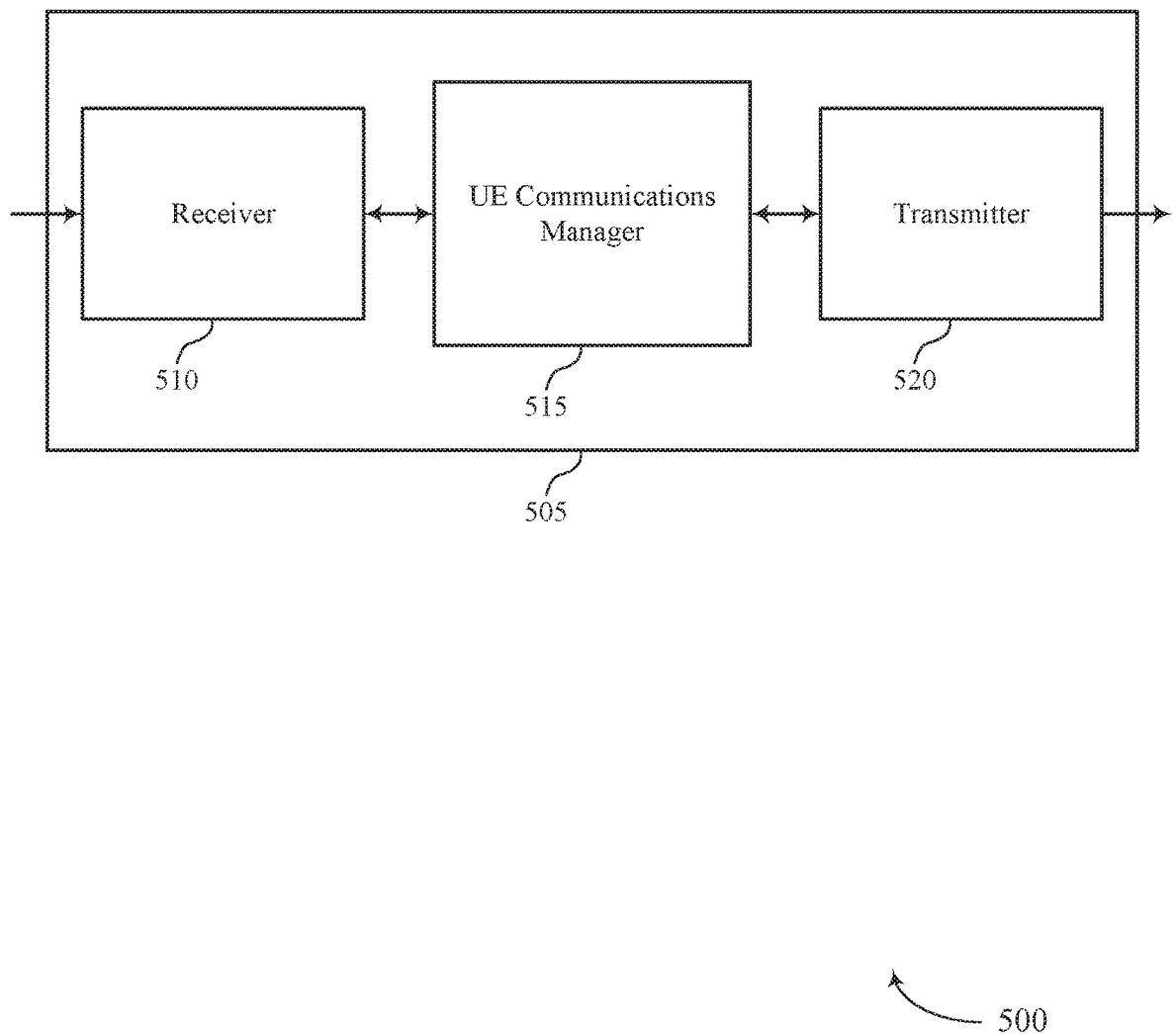
FIGS. 5 through 7 show block diagrams of a device that supports techniques for non-zero-power beams in wireless systems in accordance with aspects of the present disclosure.

FIG. 5 shows a block diagram 500 of a wireless device 505 that supports techniques for non-zero-power beams in wireless systems in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to techniques for non-zero-power beams in wireless systems, etc.). Information may be passed on to other components of the device. The receiver 510 may be an example of aspects of the transceiver 835 described with reference to FIG. 8.

UE communications manager 515 may be an example of aspects of the UE communications manager 815 described with reference to FIG. 8. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may receive a configuration indicating a number of beams to be reported in a CS report. UE communications manager 515 may receive a set of reference signals. UE communications manager 515 may identify, for one or more spatial layers and based at least in part on the set of reference signals, a set of beams corresponding to the number of beams for reporting in the CSI report. UE communications manager 515 may generate the CSI report including at least one beam coefficient for each non-zero-power beam for each of the one or more spatial layers and an indicator of a number of the beam coefficients. UE communications manager may transmit the CSI report (e.g., via transmitter 520).

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8.

Figure 6:
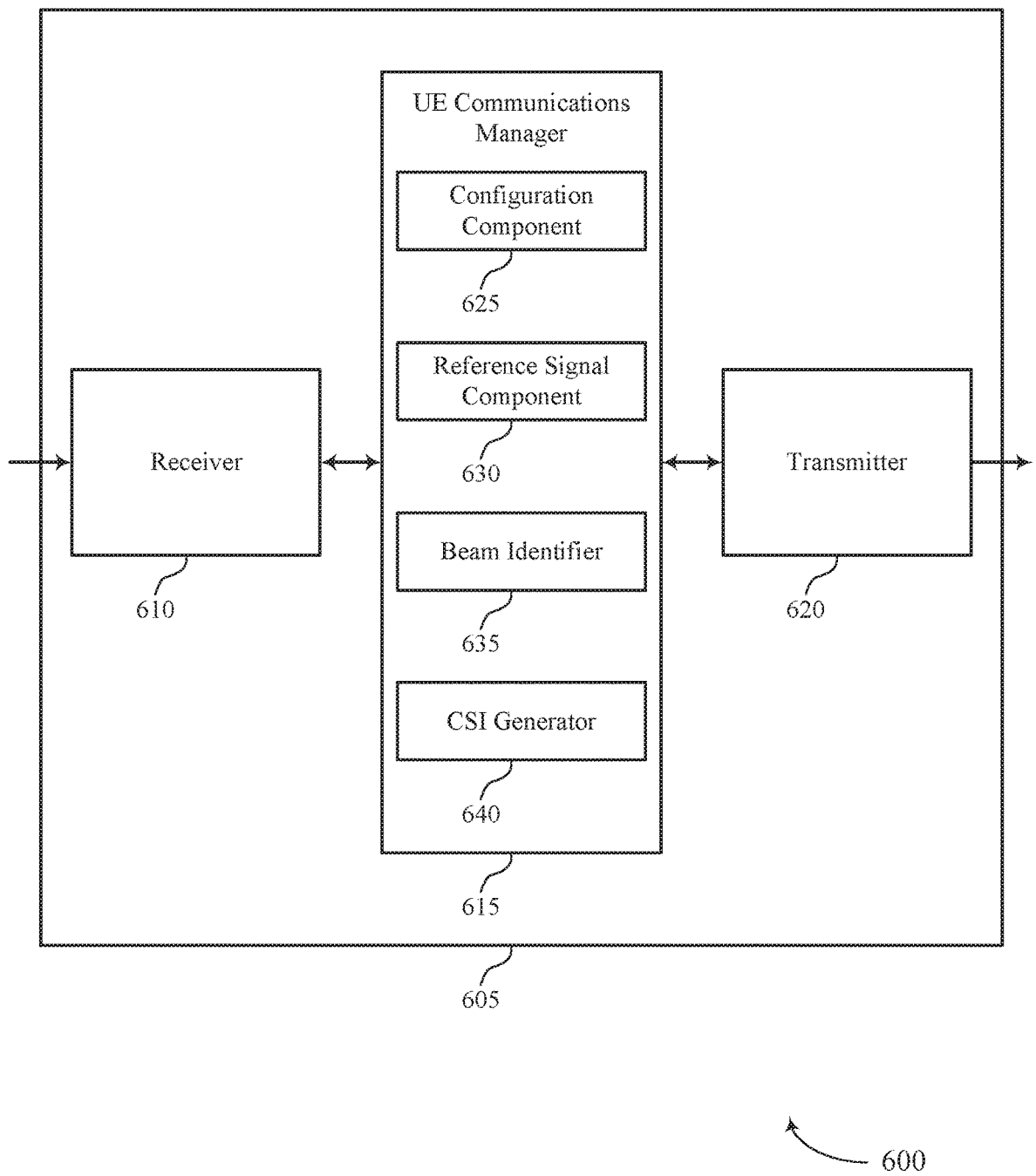

FIG. 6 shows a block diagram 600 of a wireless device 605 that supports techniques for non-zero-power beams in wireless systems in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to techniques for non-zero-power beams in wireless systems, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. UE communications manager 615 may also include configuration component 625, reference signal component 630, beam identifier 635, and CSI generator 640.

Configuration component 625 may receive a configuration indicating a number of beams to be reported in a CSI report. In some cases, the configuration includes a triggering condition, where the CSI report is generated based on the triggering condition. Configuration component 625 may determine a format of the indicator based at least in part on the triggering condition. Configuration component 625 may determine that the triggering condition is satisfied, wherein a format of the CSI report is based at least in part on the determining whether the triggering condition is satisfied. Configuration component 625 may determine that the triggering condition is not satisfied, wherein a format of a second CSI report is based at least in part on the determining that the triggering condition is not satisfied. In some cases, the set of reference signals is associated with a first polarization for a first set of antenna ports and a second polarization (e.g., or the first polarization) for a second set of antenna ports. In some cases, the first and second sets of antenna ports each include a first number of antenna ports in a first direction and a second number of antenna ports in a second direction. The first direction may be associated with a first oversampling ratio and the second direction may be associated with a second oversampling ratio. In some cases, the configuration is received via RRC signaling, a MAC CE, or downlink control signaling, the configuration further including a reporting setting.

Reference signal component 630 may receive a set of reference signals. The reference signals may be precoded or non-precoded. The precoding may be transparent to a receiving device (e.g., device 605). In some cases, device 605 may determine whether to identify a combination of antenna ports (e.g., for precoded CSI-RS) or beams (e.g., for non-precoded CSI-RS) based on the configuration. For example, if the configuration indicates use of a Type II port selection codebook, device 605 may identify a combination of antenna ports. If the configuration indicates use of a Type II codebook, device 605 may identify a combination of beams.

Beam identifier 635 may identify, for one or more spatial layers, a set of beams (e.g., a set of antenna ports) corresponding to the number of beams for reporting in the CSI report. For example, the set of beams may include at least one non-zero-power beam. In some cases, the set of beams applies to a first set of antenna ports and/or a second set of antenna ports.

CSI generator 640 may generate the CSI report including at least one beam coefficient for each non-zero-power beam for each of the one or more spatial layers and an indicator of a number of the beam coefficients. In some cases, the CSI report further includes an index of each beam of the set of beams, each index corresponding to a beam position in a codebook or to a reference signal position in the set of reference signals. In some cases, the set of bits indicating the number (e.g., or set) of non-zero-power beams in the set of beams includes a power indicator bit for each beam of the set of beams. In some cases, the indicator includes a first set of bits indicating a first number (e.g., or set) of non-zero-power beams for the first set of antenna ports and the second set of antenna ports for a first spatial layer of the one or more spatial layers and a second set of bits indicating a second number (e.g., or set) of non-zero-power beams for the first set of antenna ports and the second set of antenna ports for a second spatial layer of the one or more spatial layers. In some cases, each set of bits includes a power indicator bit for each beam of the set of beams. In some cases, the indicator includes a first set of bits indicating a first number (e.g., or set) of non-zero-power beams in the set of beams for the first set of antenna ports and a second set of bits indicating a second number (e.g., or set) of non-zero-power beams in the set of beams for the second set of antenna ports, each non-zero-power beam of the first number (e.g., or set) of non-zero-power beams and each non-zero-power beam of the second number (e.g., or set) of non-zero-power beams applying to each of the one or more spatial layers.

In some cases, the first set of bits includes a power indicator bit for each beam of the set of beams over the first set of antenna ports and the second set of bits includes a power indicator bit for each beam of the set of beams over the second set of antenna ports. In some cases, the indicator includes a set of bits indicating a number (e.g., or set) of non-zero-power beams in the set of beams, each non-zero-power beam of the number (e.g., or set) of non-zero-power beams applying to the first set of antenna ports and the second set of antenna ports on each of the one or more spatial layers. In some cases, each of the respective sets of bits includes a power indicator bit for each beam of the set of beams for a corresponding set of antenna ports and a corresponding spatial layer. In some cases, the CSI report further includes a RI. In some cases, the beam coefficients for each non-zero-power beam of the set of beams include a wideband beam amplitude, a subband beam amplitude, a subband beam phase, or a combination thereof. In some cases, a reporting payload size of the beam coefficients for each non-zero-power beam of the set of beams is based on the indicator. In some cases, the indicator includes a set of bits, and a size of the set of bits is based on the number of beams or is fixed. In some cases, the one or more spatial layers includes a set of spatial layers, and the indicator includes a respective set of bits indicating a respective number of non-zero-power beams for each of the first set of antenna ports and the second set of antenna ports for each of the set of spatial layers.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
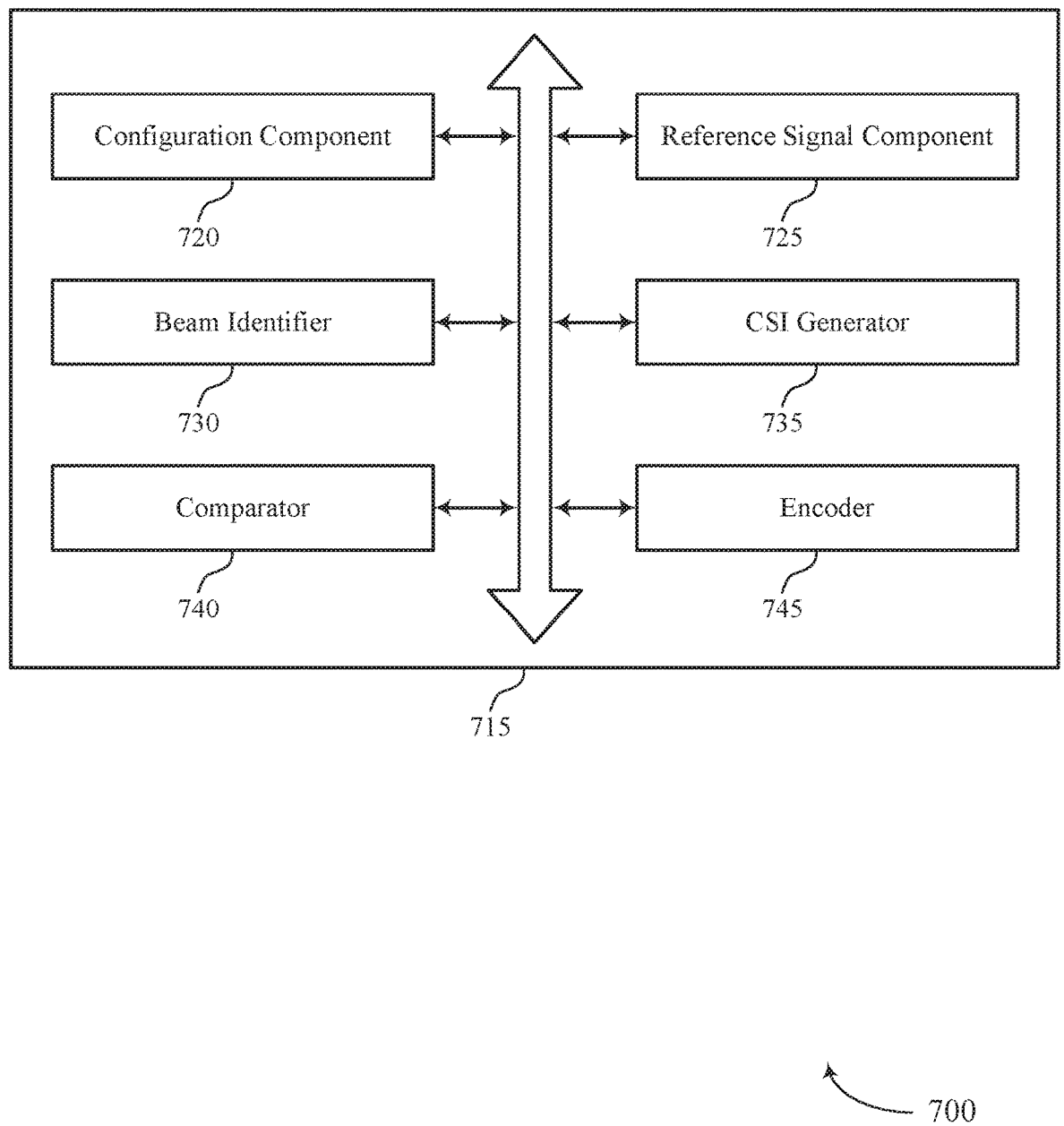

FIG. 7 shows a block diagram 700 of a UE communications manager 715 that supports techniques for non-zero-power beams in wireless systems in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include configuration component 720, reference signal component 725, beam identifier 730, CSI generator 735, polarization component 740, and encoder 745. Each of these modules may communicate, directly or indirectly, with one another (e.g., via one or more buses).

Configuration component 720 may receive a configuration indicating a number of beams to be reported in a CSI report. In some cases, the configuration component includes a triggering condition, where the CSI report is generated based on the triggering condition. Configuration component 720 may determine a format of the indicator based at least in part on the triggering condition. Configuration component 720 may determine that the triggering condition is satisfied, wherein a format of the CSI report is based at least in part on the determining whether the triggering condition is satisfied. Configuration component 720 may determine that the triggering condition is not satisfied, wherein a format of a second CSI report is based at least in part on the determining that the triggering condition is not satisfied. In some cases, the set of reference signals is associated with a first set of antenna ports for the first polarization and a second set of antenna ports for the second polarization. In some cases, the first and second sets of antenna ports each include a first number of antenna ports in a first direction and a second number of antenna ports in a second direction. The first direction may be associated with a first oversampling ratio and the second direction may be associated with a second oversampling ratio. In some cases, the configuration is received via RRC signaling, a MAC CE, or downlink control signaling, the configuration further including a reporting setting.

Reference signal component 725 may receive a set of reference signals. The precoding may be transparent to a receiving device (e.g., a UE 115). In some cases, the UE 115 may determine whether to identify a combination of antenna ports (e.g., for precoded CSI-RS) or beams (e.g., for non-precoded CSI-RS) based on the configuration. For example, if the configuration indicates use of a Type II port selection codebook, the UE 115 may identify a combination of antenna ports. If the configuration indicates use of a Type II codebook, the UE 115 may identify a combination of beams.

Beam identifier 730 may identify, for one or more spatial layers and based at least in part on the set of reference signals, a set of beams corresponding to the number of beams for reporting in the CSI report. In some cases, each beam of the set of beams corresponds to a codeword of a codebook. Alternatively, each beam of the set of beams may correspond to a respective antenna port.

CSI generator 735 may generate the CSI report including at least one beam coefficient for each non-zero-power beam for each of the one or more spatial layers and an indicator of a number of the beam coefficients. In some cases, the CSI report further includes an index of each beam of the set of beams, each index corresponding to a beam position in a codebook or to a reference signal position in the set of reference signals. In some cases, the set of bits indicating the number (e.g., or set) of non-zero-power beams in the set of beams includes a power indicator bit for each beam of the set of beams. In some cases, the indicator includes a first set of bits indicating a first number (e.g., or set) of non-zero-power beams for the first set of antenna ports and the second set of antenna ports for a first spatial layer of the one or more spatial layers and a second set of bits indicating a second number (e.g., or set) of non-zero-power beams for the first set of antenna ports and the second set of antenna ports for a second spatial layer of the one or more spatial layers. In some cases, each set of bits includes a power indicator bit for each beam of the set of beams. In some cases, the indicator includes a first set of bits indicating a first number (e.g., or set) of non-zero-power beams in the set of beams for the first set of antenna ports and a second set of bits indicating a second number (e.g., or set) of non-zero-power beams in the set of beams for the second set of antenna ports, each non-zero-power beam of the first number (e.g., or set) of non-zero-power beams and each non-zero-power beam of the second number (e.g., or set) of non-zero-power beams applying to each of the one or more spatial layers.

In some cases, the first set of bits includes a power indicator bit for each beam of the set of beams over the first set of antenna ports and the second set of bits includes a power indicator bit for each beam of the set of beams over the second set of antenna ports. In some cases, the indicator includes a set of bits indicating a number (e.g., or set) of non-zero-power beams in the set of beams, each non-zero-power beam of the number (e.g., or set) of non-zero-power beams applying to the first set of antenna ports and the second set of antenna ports on each of the one or more spatial layers. In some cases, each of the respective sets of bits includes a power indicator bit for each beam of the set of beams for a corresponding set of antenna ports and a corresponding spatial layer. In some cases, the CSI report further includes a RI. In some cases, the beam coefficients for each non-zero-power beam of the set of beams include a wideband beam amplitude, a subband beam amplitude, a subband beam phase, or a combination thereof. In some cases, a reporting payload size of the beam coefficients for each non-zero-power beam of the set of beams is based on the indicator. In some cases, the indicator includes a set of bits, and a size of the set of bits is based on the number of beams or is fixed. In some cases, the one or more spatial layers includes a set of spatial layers, and the indicator includes a respective set of bits indicating a respective number of non-zero-power beams for each of the first set of antenna ports and the second set of antenna ports for each of the set of spatial layers.

Comparator 840 may compare a weight of the at least one non-zero-power beam for at least one of the one or more spatial layers and at least one of the first set of antenna ports or the second set of antenna ports to a threshold, where the at least one non-zero-power beam is identified based on a result of the comparing.

Encoder 845 may jointly encode RI and the indicator. In some cases, the RI and the indicator are encoded separately. In some cases, the joint encoding includes one of directly cascading the payload of the RI and the indicator or jointly quantizing the RI and the indicator. In some cases jointly quantizing the RI is based on a subsampling of at least one of the RI or the indicator, or a lookup table of a combination of the R and the indicator. In some cases, the index of each beam and the indicator are jointly encoded.

Figure 8:
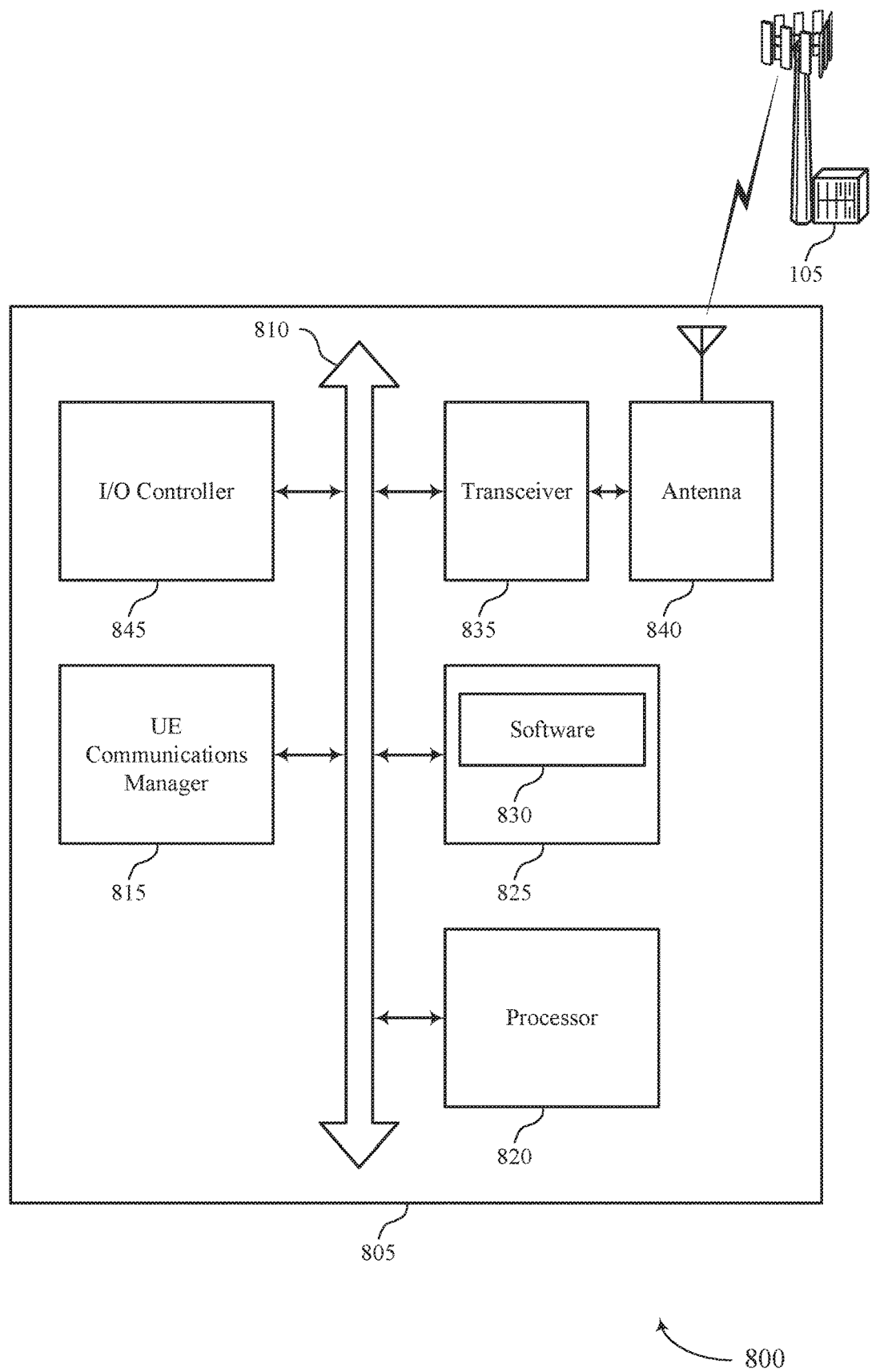
FIG. 8 illustrates a block diagram of a system including a UE that supports techniques for non-zero-power beams in wireless systems in accordance with aspects of the present disclosure.

FIG. 8 shows a diagram of a system 800 including a device 805 that supports techniques for non-zero-power beams in wireless systems in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

UE communications manager 815 may receive a configuration indicating a number of beams to be reported in a CSI report. UE communications manager 815 may receive a set of reference signals. UE communications manager 815 may identify, for one or more spatial layers and based at least in part on the set of reference signals, a set of beams corresponding to the number of beams for reporting in the CSI report. UE communications manager 815 may generate the CST report including at least one beam coefficient for each non-zero-power beam for each of the one or more spatial layers and an indicator of a number of the beam coefficients. UE communications manager may transmit the CSI report (e.g., via transceiver 835).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting techniques for non-zero-power beams in wireless systems).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support techniques for non-zero-power beams in wireless systems. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
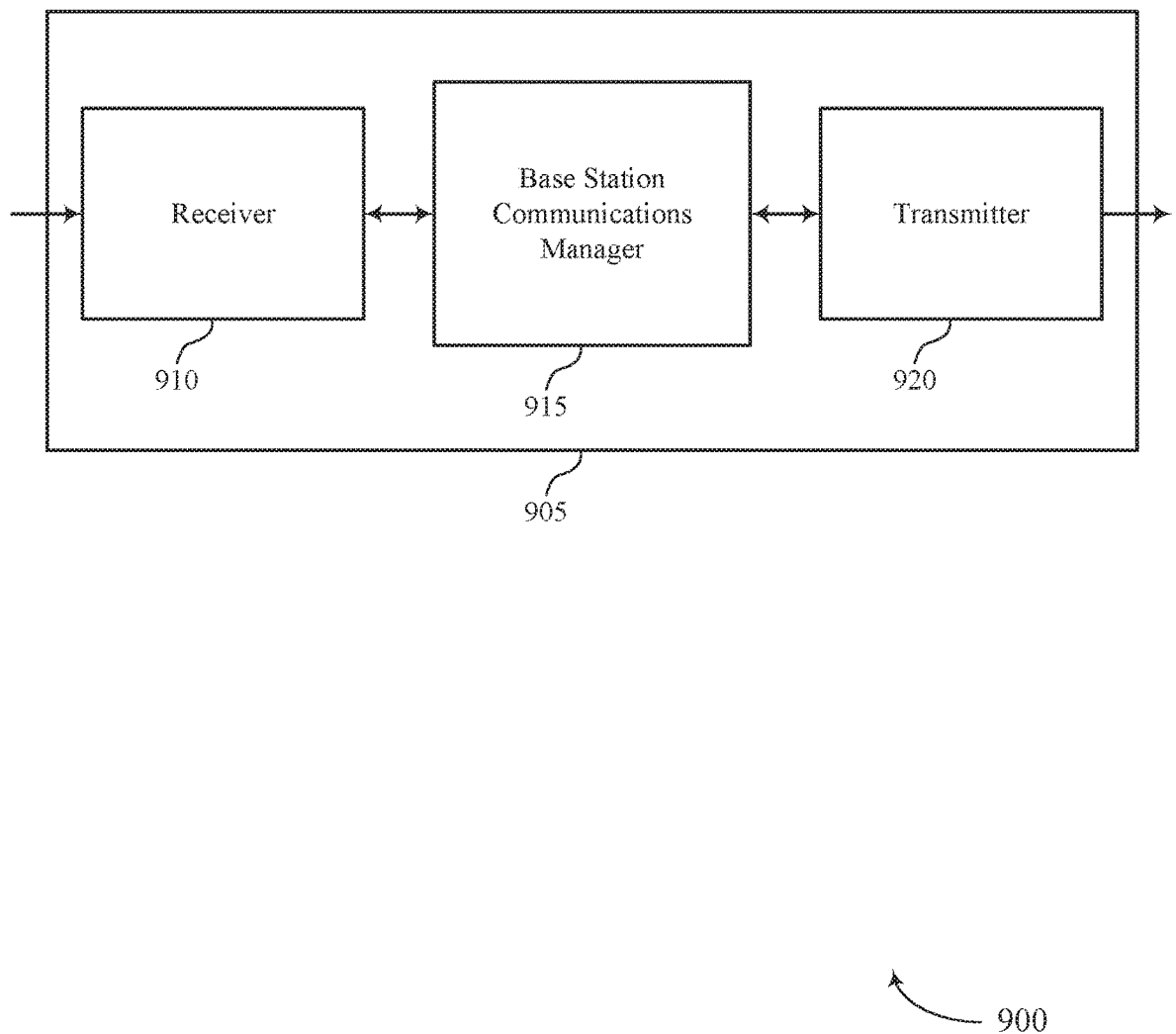
FIGS. 9 through 11 show block diagrams of a device that supports techniques for non-zero-power beams in wireless systems in accordance with aspects of the present disclosure.

FIG. 9 shows a block diagram 900 of a wireless device 905 that supports techniques for non-zero-power beams in wireless systems in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to techniques for non-zero-power beams in wireless systems, etc.). Information may be passed on to other components of the device. The receiver 910 may be an example of aspects of the transceiver 1235 described with reference to FIG. 12.

Base station communications manager 915 may be an example of aspects of the base station communications manager 1215 described with reference to FIG. 12. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may transmit, to a UE, a configuration indicating a number of beams to be reported in a CSI report. Base station communications manager 915 may transmit a set of reference signals. Base station communications manager 915 may receive the CSI report from the UE, where the CSI report indicates a set of beams corresponding to the number of beams for reporting in the CSI report, the CSI report further including at least one beam coefficient for each non-zero-power beam of the set of beams for each of one or more spatial layers and an indicator of a number of the beam coefficients. Base station communications manager 915 may parse the set of beam coefficients based on the CSI report.

Transmitter 920 may transmit signals generated by other components of the device. In some examples, the transmitter 920 may be collocated with a receiver 10 in a transceiver module. For example, the transmitter 920 may be an example of aspects of the transceiver 935 described with reference to FIG.

Figure 10:
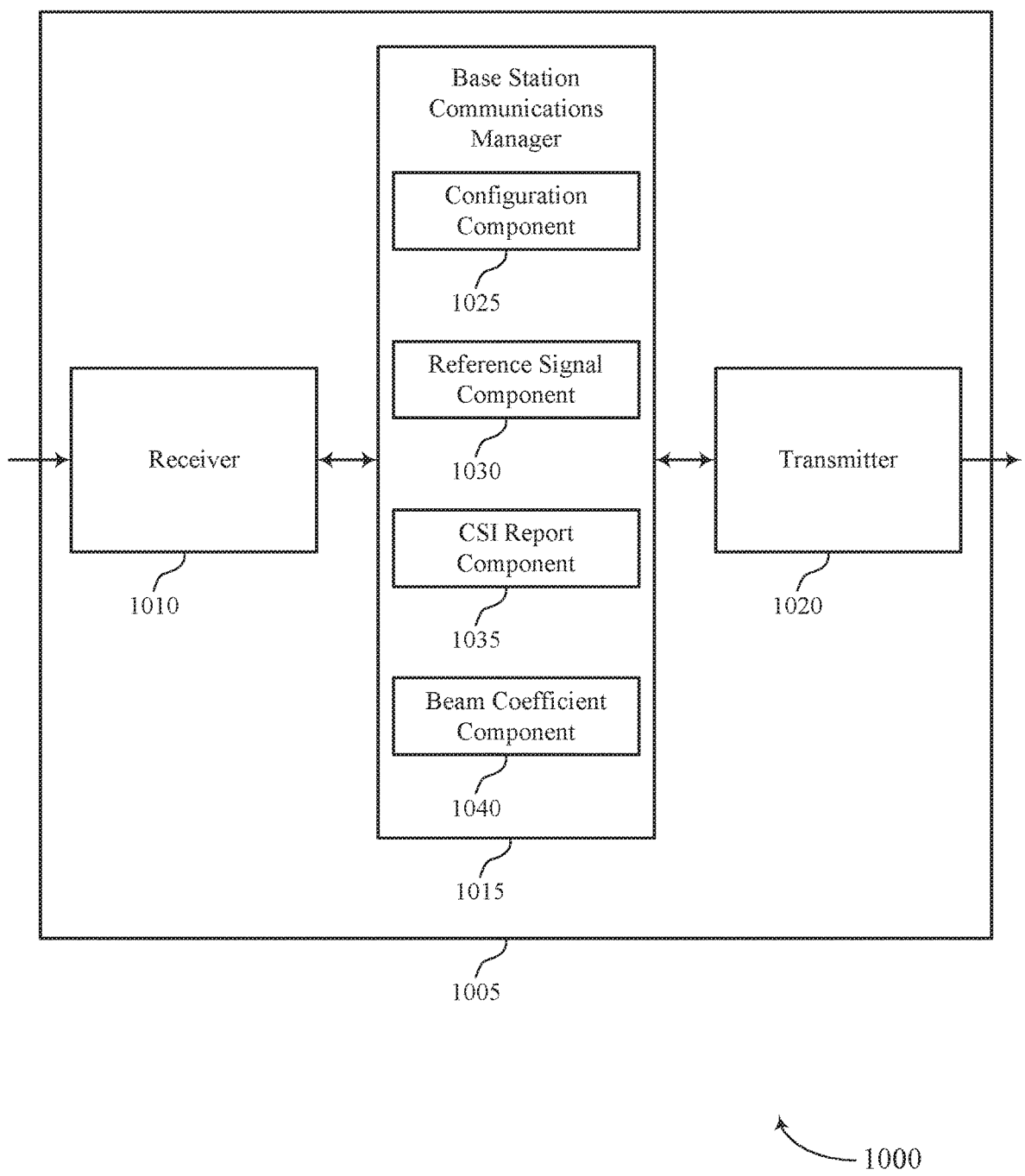

FIG. 10 shows a block diagram 1000 of a wireless device 1005 that supports techniques for non-zero-power beams in wireless systems in accordance with aspects of the present disclosure. Wireless device 1005 may be an example of aspects of a wireless device 1005 or a base station 105 as described above. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to techniques for non-zero-power beams in wireless systems, etc.). Information may be passed on to other components of the device. The receiver 1010 may be an example of aspects of the transceiver 1235 described with reference to FIG. 12.

Base station communications manager 1015 may be an example of aspects of the base station communications manager 1215 described with reference to FIG. 12. Base station communications manager 1015 may also include configuration component 1025, reference signal component 1030, CSI report component 1035, and beam coefficient component 1040.

Configuration component 1025 may transmit, to a UE, a configuration indicating a number of beams to be reported in a CSI report. In some cases, the configuration component includes a triggering condition, where the CSI report is generated based on the triggering condition. Configuration component 1025 may determine a format of the indicator based at least in part on the triggering condition. Configuration component 1025 may determine that the triggering condition is satisfied, wherein a format of the CSI report is based at least in part on the determining whether the triggering condition is satisfied. Configuration component 1025 may determine that the triggering condition is not satisfied, wherein a format of a second CSI report is based at least in part on the determining that the triggering condition is not satisfied. In some cases, the set of reference signals is associated with a first set of antenna ports for the first polarization and a second set of antenna ports for the second polarization. In some cases, the first and second sets of antenna ports each include a first number of antenna ports in a first direction and a second number of antenna ports in a second direction. The first direction may be associated with a first oversampling ratio and the second direction may be associated with a second oversampling ratio. In some cases, the configuration is transmitted via downlink control signaling.

Reference signal component 1030 may transmit a set of reference signals. In some cases, the set of beams applies to a first set of antenna ports and a second set of antenna ports. In some cases, transmitting the set of reference signals includes transmitting a set of non-precoded reference signals, where each beam of the set of beams corresponds to a codeword of a codebook. In some cases, transmitting the set of reference signals includes transmitting precoded reference signals over respective antenna ports, wherein each beam of the set of beams corresponds to one of the antenna ports.

CSI report component 1035 may receive the CSI report from the UE, where the CSI report indicates a set of beams corresponding to the number of beams for reporting in the CSI report, the CSI report further including at least one beam coefficient for each non-zero-power beam of the set of beams for each of one or more spatial layers and an indicator of a number of the beam coefficients. In some cases, the RI and the indicator are encoded separately. Alternatively, the RI and the indicator may be jointly encoded. In some cases, the joint encoding includes one of directly cascading the payload of the RI and the indicator or jointly quantizing the RI and the indicator. In some cases jointly quantizing the RI is based on a subsampling of at least one of the RI or the indicator, or a lookup table of a combination of the RI and the indicator. In some cases, the index of each beam and the indicator are jointly encoded. In some cases, the set of bits indicating the number of non-zero-power beams in the set of beams includes a power indicator bit for each beam of the set of beams.

In some cases, the CSI report further includes an index of each beam of the set of beams, each index corresponding to a beam position in a codebook or to a reference signal position in the set of reference signals. In some cases, the set of bits indicating the number (e.g., or set) of non-zero-power beams in the set of beams includes a power indicator bit for each beam of the set of beams. In some cases, the indicator includes a first set of bits indicating a first number (e.g., or set) of non-zero-power beams for the first set of antenna ports and the second set of antenna ports for a first spatial layer of the one or more spatial layers and a second set of bits indicating a second number (e.g., or set) of non-zero-power beams for the first set of antenna ports and the second set of antenna ports for a second spatial layer of the one or more spatial layers. In some cases, each set of bits includes a power indicator bit for each beam of the set of beams. In some cases, the indicator includes a first set of bits indicating a first number (e.g., or set) of non-zero-power beams in the set of beams for the first set of antenna ports and a second set of bits indicating a second number (e.g., or set) of non-zero-power beams in the set of beams for the second set of antenna ports, each non-zero-power beam of the first number (e.g., or set) of non-zero-power beams and each non-zero-power beam of the second number (e.g., or set) of non-zero-power beams applying to each of the one or more spatial layers.

In some cases, the first set of bits includes a power indicator bit for each beam of the set of beams over the first set of antenna ports and the second set of bits includes a power indicator bit for each beam of the set of beams over the second set of antenna ports. In some cases, the indicator includes a set of bits indicating a number (e.g., or set) of non-zero-power beams in the set of beams, each non-zero-power beam of the number (e.g., or set) of non-zero-power beams applying to the first set of antenna ports and the second set of antenna ports on each of the one or more spatial layers. In some cases, each of the respective sets of bits includes a power indicator bit for each beam of the set of beams for a corresponding set of antenna ports and a corresponding spatial layer. In some cases, the CSI report further includes a RI. In some cases, the at least one beam coefficient for each non-zero-power beam of the set of beams include a wideband beam amplitude, a subband beam amplitude, a subband beam phase, or a combination thereof. In some cases, a reporting payload size of the beam coefficients for each non-zero-power beam of the set of beams is based on the indicator. In some cases, the indicator includes a set of bits, and a size of the set of bits is based on the number of beams or is fixed. In some cases, the one or more spatial layers includes a set of spatial layers, and the indicator includes a respective set of bits indicating a respective number of non-zero-power beams for each of the first set of antenna ports and the second set of antenna ports for each of the set of spatial layers.

In some cases, a reporting payload size of the beam coefficients for each non-zero-power beam of the set of beams is based on the indicator. In some cases, the indicator includes a set of bits, and a size of the set of bits is based on the number of beams or is fixed. In some cases, the CSI report further includes an index of each beam of the set of beams, each index corresponding to a beam position in a codebook or to a reference signal position in the set of reference signals.

Beam coefficient component 1040 may parse the set of beam coefficients based on the indicator of the non-zero-power beams. In some cases, the at least one beam coefficient for each non zero-power beam of the subset include a wideband beam amplitude, a subband beam amplitude, a subband beam phase, or a combination thereof.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12.

Figure 11:
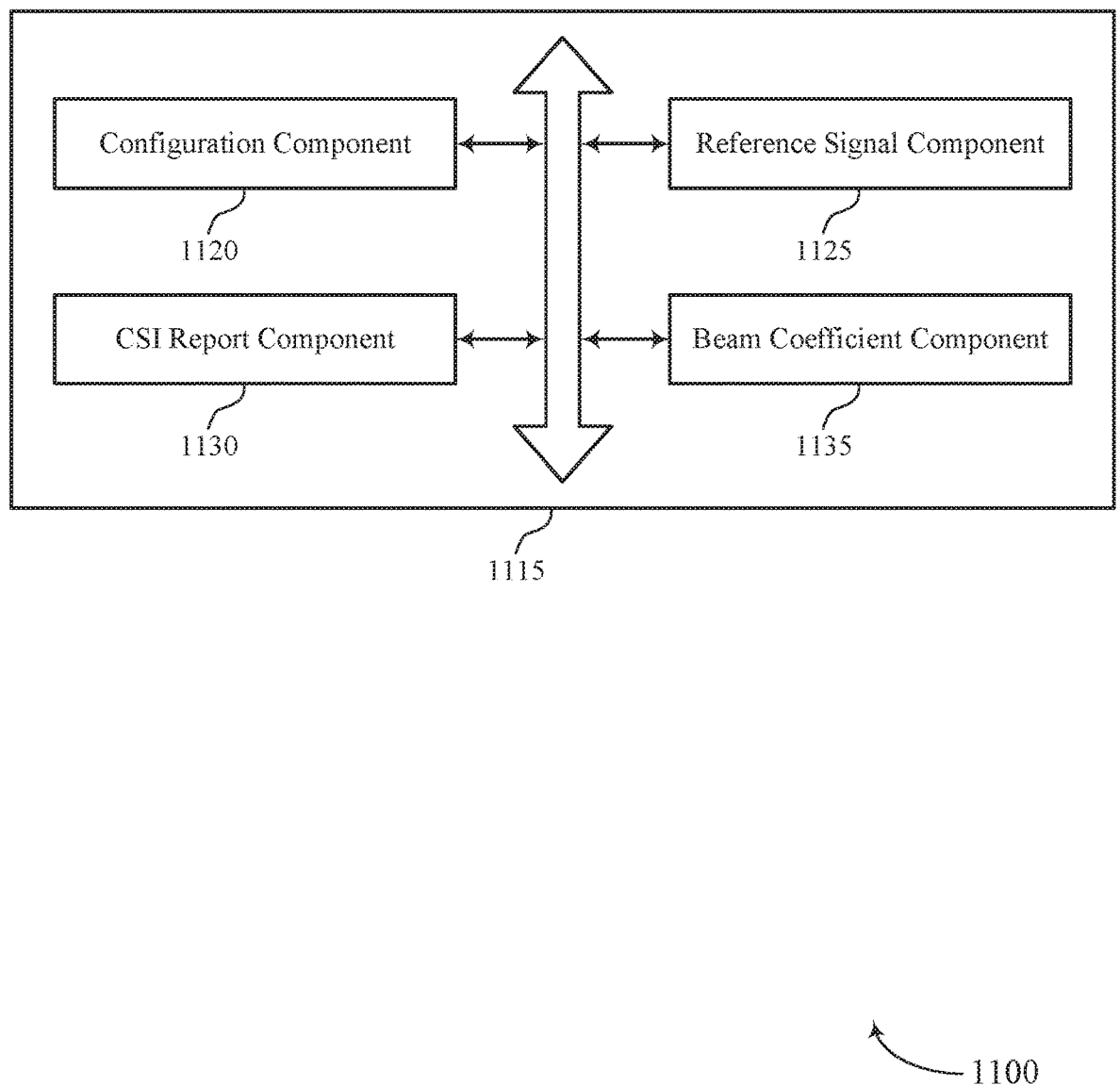

FIG. 11 shows a block diagram 1100 of a base station communications manager 1115 that supports techniques for non-zero-power beams in wireless systems in accordance with aspects of the present disclosure. The base station communications manager 1115 may be an example of aspects of a base station communications manager 1215 described with reference to FIGS. 9, 10, and 12. The base station communications manager 1115 may include configuration component 1120, reference signal component 1125, CSI report component 1130, and beam coefficient component 1135. Each of these modules may communicate, directly or indirectly, with one another (e.g., via one or more buses).

Configuration component 1125 may transmit, to a UE, a configuration indicating a number of beams to be reported in a CSI report. In some cases, the configuration component includes a triggering condition, where the CSI report is generated based on the triggering condition. Configuration component 1125 may determine a format of the indicator based at least in part on the triggering condition. Configuration component 1125 may determine that the triggering condition is satisfied, wherein a format of the CSI report is based at least in part on the determining whether the triggering condition is satisfied.

Configuration component 1120 may transmit, to a UE, a configuration indicating a number of beams to be reported in a CSI report. In some cases, the configuration component includes a triggering condition, where the CSI report is generated based on the triggering condition. Configuration component 1120 may determine a format of the indicator based at least in part on the triggering condition. Configuration component 1120 may determine that the triggering condition is satisfied, wherein a format of the CSI report is based at least in part on the determining whether the triggering condition is satisfied. Configuration component 1120 may determine that the triggering condition is not satisfied, wherein a format of a second CSI report is based at least in part on the determining that the triggering condition is not satisfied. In some cases, the set of reference signals is associated with a first set of antenna ports for the first polarization and a second set of antenna ports for the second polarization. In some cases, the first and second sets of antenna ports each include a first number of antenna ports in a first direction and a second number of antenna ports in a second direction. The first direction may be associated with a first oversampling ratio and the second direction may be associated with a second oversampling ratio. In some cases, the configuration is transmitted via downlink control signaling.

Reference signal component 1125 may transmit a set of reference signals. In some cases, the set of beams applies to a first set of antenna ports and a second set of antenna ports. In some cases, transmitting the set of reference signals includes transmitting a set of non-precoded reference signals, where each beam of the set of beams corresponds to a codeword of a codebook. In some cases, transmitting the set of reference signals includes transmitting precoded reference signals over respective antenna ports, wherein each beam of the set of beams corresponds to one of the antenna ports.

CSI report component 1130 may receive the CSI report from the UE, where the CSI report indicates a set of beams corresponding to the number of beams for reporting in the CSI report, the CSI report further including at least one beam coefficient for each non-zero-power beam of the set of beams for each of one or more spatial layers and an indicator of a number of the beam coefficients. In some cases, the RI and the indicator are encoded separately. Alternatively, the RI and the indicator may be jointly encoded. In some cases, the joint encoding includes one of directly cascading the payload of the RI and the indicator or jointly quantizing the RI and the indicator. In some cases jointly quantizing the RI is based on a subsampling of at least one of the RI or the indicator, or a lookup table of a combination of the RI and the indicator. In some cases, the index of each beam and the indicator are jointly encoded. In some cases, the set of bits indicating the number of non-zero-power beams in the set of beams includes a power indicator bit for each beam of the set of beams.

In some cases, the CST report further includes an index of each beam of the set of beams, each index corresponding to a beam position in a codebook or to a reference signal position in the set of reference signals. In some cases, the set of bits indicating the number (e.g., or set) of non-zero-power beams in the set of beams includes a power indicator bit for each beam of the set of beams. In some cases, the indicator includes a first set of bits indicating a first number (e.g., or set) of non-zero-power beams for the first set of antenna ports and the second set of antenna ports for a first spatial layer of the one or more spatial layers and a second set of bits indicating a second number (e.g., or set) of non-zero-power beams for the first set of antenna ports and the second set of antenna ports for a second spatial layer of the one or more spatial layers. In some cases, each set of bits includes a power indicator bit for each beam of the set of beams. In some cases, the indicator includes a first set of bits indicating a first number (e.g., or set) of non-zero-power beams in the set of beams for the first set of antenna ports and a second set of bits indicating a second number (e.g., or set) of non-zero-power beams in the set of beams for the second set of antenna ports, each non-zero-power beam of the first number (e.g., or set) of non-zero-power beams and each non-zero-power beam of the second number (e.g., or set) of non-zero-power beams applying to each of the one or more spatial layers.

In some cases, the first set of bits includes a power indicator bit for each beam of the set of beams over the first set of antenna ports and the second set of bits includes a power indicator bit for each beam of the set of beams over the second set of antenna ports. In some cases, the indicator includes a set of bits indicating a number (e.g., or set) of non-zero-power beams in the set of beams, each non-zero-power beam of the number (e.g., or set) of non-zero-power beams applying to the first set of antenna ports and the second set of antenna ports on each of the one or more spatial layers. In some cases, each of the respective sets of bits includes a power indicator bit for each beam of the set of beams for a corresponding set of antenna ports and a corresponding spatial layer. In some cases, the CSI report further includes a RI. In some cases, the beam coefficients for each non-zero-power beam of the set of beams include a wideband beam amplitude, a subband beam amplitude, a subband beam phase, or a combination thereof. In some cases, a reporting payload size of the beam coefficients for each non-zero-power beam of the set of beams is based on the indicator. In some cases, the indicator includes a set of bits, and a size of the set of bits is based on the number of beams or is fixed. In some cases, the one or more spatial layers includes a set of spatial layers, and the indicator includes a respective set of bits indicating a respective number of non-zero-power beams for each of the first set of antenna ports and the second set of antenna ports for each of the set of spatial layers.

In some cases, a reporting payload size of the beam coefficients for each non-zero-power beam of the set of beams is based on the indicator. In some cases, the indicator includes a set of bits, and a size of the set of bits is based on the number of beams or is fixed. In some cases, the CSI report further includes an index of each beam of the set of beams, each index corresponding to a beam position in a codebook or to a reference signal position in the set of reference signals.

Beam coefficient component 1135 may parse the set of beam coefficients based on the indicator of the non-zero-power beams. In some cases, the at least one beam coefficient for each non zero-power beam of the subset include a wideband beam amplitude, a subband beam amplitude, a subband beam phase, or a combination thereof.

Figure 12:
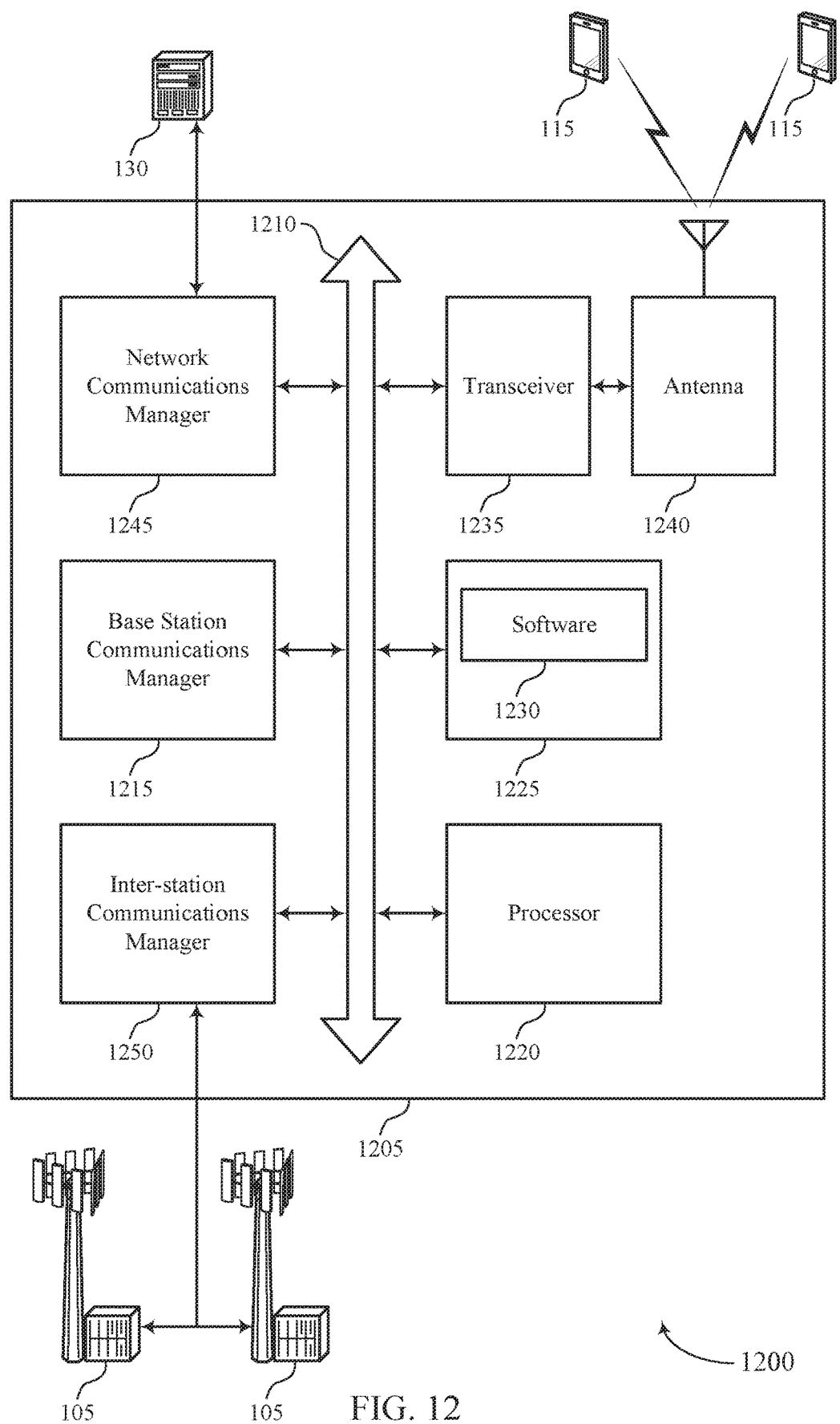
FIG. 12 illustrates a block diagram of a system including a base station that supports techniques for non-zero-power beams in wireless systems in accordance with aspects of the present disclosure.

FIG. 12 shows a diagram of a system 1200 including a device 1205 that supports techniques for non-zero-power beams in wireless systems in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Base station communications manager 1215 may transmit, to a UE, a configuration indicating a number of beams to be reported in a CS report. Base station communications manager 1215 may transmit a set of reference signals. Base station communications manager 1215 may receive the CSI report from the UE, where the CSI report indicates a set of beams corresponding to the number of beams for reporting in the CSI report, the CSI report further including at least one beam coefficient for each non-zero-power beam of the set of beams for each of one or more spatial layers and an indicator of a number of the beam coefficients. Base station communications manager 1215 may parse the set of beam coefficients based on the CSI report.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting techniques for non-zero-power beams in wireless systems).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support techniques for non-zero-power beams in wireless systems. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
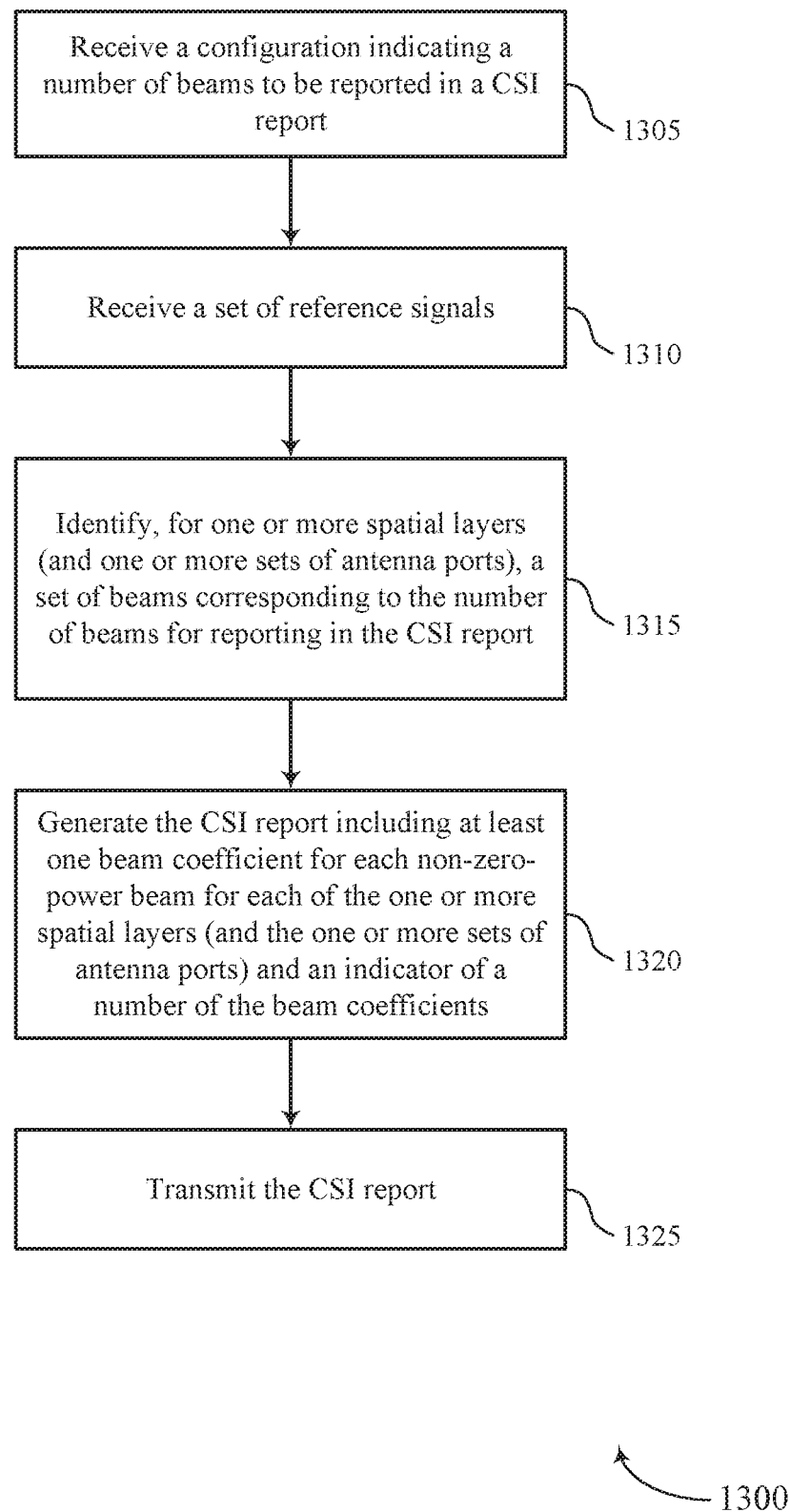
FIGS. 13 through 14 illustrate methods that support techniques for non-zero-power beams in wireless systems in accordance with aspects of the present disclosure.

FIG. 13 shows a flowchart illustrating a method 1300 for techniques for non-zero-power beams in wireless systems in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may receive a configuration indicating a number of beams to be reported in a CSI report. The operations of block 1305 may be performed according to the methods described herein. In certain examples, aspects of the operations of block 1305 may be performed by a configuration component as described with reference to FIGS. 5 through 8.

At block 1310 the UE 115 may receive a set of reference signals. The operations of block 1310 may be performed according to the methods described herein. In certain examples, aspects of the operations of block 1310 may be performed by a reference signal component as described with reference to FIGS. 5 through 8.

At block 1315 the UE 115 may identify, for one or more spatial layers (e.g., and one or more sets of antenna ports), a set of beams corresponding to the number of beams for reporting in the CSI report. The operations of block 1315 may be performed according to the methods described herein. In certain examples, aspects of the operations of block 1315 may be performed by a beam identifier as described with reference to FIGS. 5 through 8.

At block 1320 the UE 115 may generate the CSI report comprising at least one beam coefficient for each non-zero-power beam for each of the one or more spatial layers (e.g., and each of the one or more sets of antenna ports) and an indicator of a number of the beam coefficients. The operations of block 1320 may be performed according to the methods described herein. In certain examples, aspects of the operations of block 1320 may be performed by a CSI generator as described with reference to FIGS. 5 through 8.

At block 1325 the UE 115 may transmit the CS report. The operations of block 1325 may be performed according to the methods described herein. In certain examples, aspects of the operations of block 1325 may be performed by a transmitter as described with reference to FIGS. 5 through 8.

Figure 14:
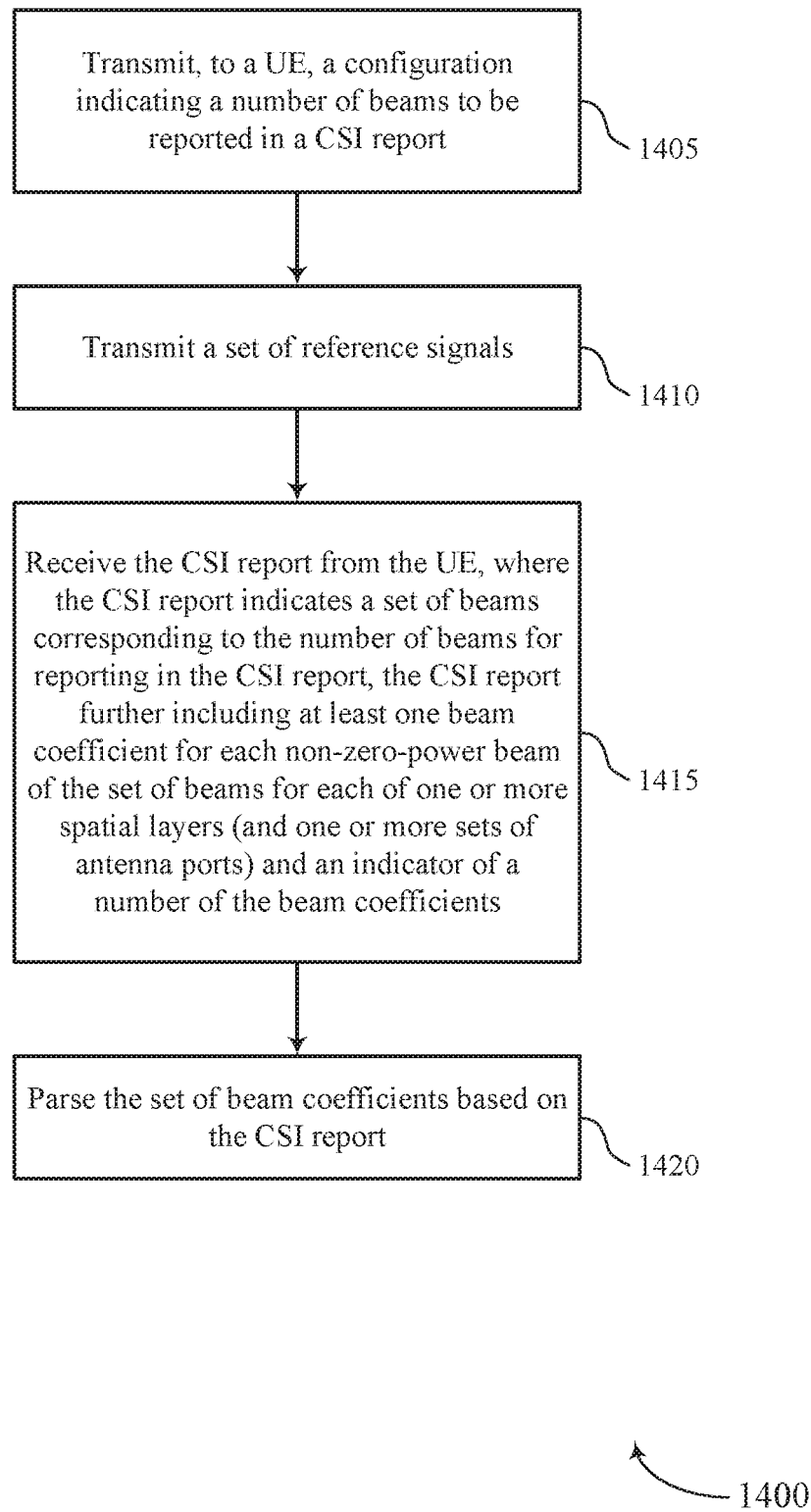

FIG. 14 shows a flowchart illustrating a method 1400 for techniques for non-zero-power beams in wireless systems in accordance with aspects of the present disclosure. The operations of method 1400 may be implemented by a base station 105 or its components as described herein. For example, the operations of method 1400 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may transmit, to a UE, a configuration indicating a number of beams to be reported in a CSI report. The operations of block 1405 may be performed according to the methods described herein. In certain examples, aspects of the operations of block 1405 may be performed by a configuration component as described with reference to FIGS. 9 through 12.

At block 1410 the base station 105 may transmit a set of reference signals. The operations of block 1410 may be performed according to the methods described herein. In certain examples, aspects of the operations of block 1410 may be performed by a reference signal component as described with reference to FIGS. 9 through 12.

At block 1415 the base station 105 may receive the CSI report from the UE, wherein the CSI report indicates a set of beams corresponding to the number of beams for reporting in the CSI report, the CSI report further comprising at least one beam coefficient for each non-zero-power beam of the set of beams for each of one or more spatial layers (e.g., and each of one or more sets of antenna ports) and an indicator of a number of the beam coefficients. The operations of block 1415 may be performed according to the methods described herein. In certain examples, aspects of the operations of block 1415 may be performed by a CSI report component as described with reference to FIGS. 9 through 12.

At block 1420 the base station 105 may parse the set of beam coefficients based at least in part on the CSI report. The operations of block 1420 may be performed according to the methods described herein. In certain examples, aspects of the operations of block 1420 may be performed by a beam coefficient component as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving a configuration indicating a number of beams to be reported in a channel state information (CSI) report;
   receiving a set of reference signals,
      wherein, for one or more spatial layers, a set of beams corresponding to the number of beams to be reported in the CSI report is based at least in part on the set of reference signals, and
      wherein the set of beams comprises at least one non-zero-power beam; and
   transmitting the CSI report comprising a beam coefficient for each of the at least one non-zero-power beam for each of the one or more spatial layers and an indicator of the at least one non-zero-power beam, wherein the indicator comprises multiple sets of bits and each set of bits indicates a number of non-zero-power beams for a corresponding spatial layer of the one or more spatial layers, wherein the CSI report excludes beam coefficients for one or more beams for at least one of the one or more spatial layers, and wherein a number of the one or more beams corresponds to an amount that the number of beams to be reported in the CSI report exceeds the number of non-zero-power beams.

2. The method of claim 1, wherein the configuration indicates a port-selection codebook and the at least one non-zero-power beam comprises a set of non-zero-power antenna ports.

3. The method of claim 1, wherein the indicator of the at least one non-zero-power beam comprises an indicator of zero-power beams, and wherein a set of non-zero-power beams is determined based on the indicator and the set of beams.

4. The method of claim 1, wherein:
   the at least one non-zero-power beam applies to at least one of a first set of antenna ports or a second set of antenna ports for the one or more spatial layers.

5. The method of claim 4, wherein each non-zero-power beam of the number of the non-zero-power beams applies to the first set of antenna ports and the second set of antenna ports on each of the one or more spatial layers.

6. The method of claim 4, wherein each non-zero-power beam of the at least one non-zero-power beam applies to the first set of antenna ports and the second set of antenna ports on each of the one or more spatial layers.

7. The method of claim 6, wherein the set of bits indicating the number of non-zero-power beams in the set of beams comprises a power indicator bit for each beam of the number of non-zero-power beams.

8. The method of claim 4, wherein the multiple sets of bits comprise a first set of bits indicating a first number of non-zero-power beams for the first set of antenna ports and the second set of antenna ports for a first spatial layer of the one or more spatial layers and a second set of bits indicating a second number of non-zero-power beams for the first set of antenna ports and the second set of antenna ports for a second spatial layer of the one or more spatial layers.

9. The method of claim 4, wherein the multiple sets of bits comprise a first set of bits indicating a first set of non-zero-power beams for the first set of antenna ports and the second set of antenna ports for a first spatial layer of the one or more spatial layers and a second set of bits indicating a second set of non-zero-power beams for the first set of antenna ports and the second set of antenna ports for a second spatial layer of the one or more spatial layers.

10. The method of claim 9, wherein each set of bits comprises a power indicator bit for each beam of the corresponding set of non-zero-power beams.

11. The method of claim 4, wherein the multiple sets of bits comprise a first set of bits indicating a first number of non-zero-power beams in the set of beams for the first set of antenna ports and a second set of bits indicating a second number of non-zero-power beams in the set of beams for the second set of antenna ports, each non-zero-power beam of the first number of non-zero-power beams and each non-zero-power beam of the second number of non-zero-power beams applying to each of the one or more spatial layers.

12. The method of claim 4, wherein the multiple sets of bits comprise a first set of bits indicating a first set of non-zero-power beams in the set of beams for the first set of antenna ports and a second set of bits indicating a second set of non-zero-power beams in the set of beams for the second set of antenna ports, each non-zero-power beam of the first set of non-zero-power beams and each non-zero-power beam of the second set of non-zero-power beams applying to each of the one or more spatial layers.

13. The method of claim 12, wherein the first set of bits comprises a power indicator bit for each beam of a set of non-zero-power beams over the first set of antenna ports and the second set of bits comprises a power indicator bit for each beam of the set of non-zero-power beams over the second set of antenna ports.

14. The method of claim 4, wherein the one or more spatial layers comprise a plurality of spatial layers, and wherein the indicator comprises a respective set of bits indicating a respective number of non-zero-power beams for each of the first set of antenna ports and the second set of antenna ports for each of the plurality of spatial layers.

15. The method of claim 4, wherein the one or more spatial layers comprise a plurality of spatial layers, and wherein the indicator comprises a respective set of bits indicating a respective set of non-zero-power beams for each of the first set of antenna ports and the second set of antenna ports for each of the plurality of spatial layers.

16. The method of claim 15, wherein each of the respective sets of bits comprises a power indicator bit for each beam of the set of non-zero-power beams for a corresponding set of antenna ports and a corresponding spatial layer.

17. The method of claim 4, wherein the first set of antenna ports or the second set of antenna ports correspond to a same polarization, or a same antenna panel, or a combination thereof.

18. The method of claim 1, wherein the CSI report further comprises a rank indication (RI).

19. The method of claim 18, wherein the RI and the indicator are encoded separately.

20. The method of claim 1, wherein the beam coefficient for each of the at least one non-zero-power beam of the set of beams comprises a wideband beam amplitude, a subband beam amplitude, a subband beam phase, or a combination thereof, and wherein a reporting payload size of the beam coefficient for each non-zero-power beam of the set of beams is based at least in part on the indicator.

21. The method of claim 1, wherein the configuration is received via radio resource control (RRC) signaling, a medium access control (MAC) control element (CE), or downlink control signaling, the configuration further comprising a reporting setting.

22. A method for wireless communication, comprising:
transmitting, to a user equipment (UE), a configuration indicating a number of beams to be reported in a channel state information (CSI) report;
transmitting a set of reference signals;
receiving the CSI report from the UE, wherein the CSI report indicates a set of beams corresponding to the number of beams to be reported in the CSI report, the CSI report further comprising at least one beam coefficient for each non-zero-power beam of the set of beams for each of one or more spatial layers and an indicator of at least one non-zero-power beam in the set of beams, wherein the indicator comprises multiple sets of bits and each set of bits indicates a number of non-zero-power beams for a corresponding spatial layer of the one or more spatial layers, wherein the CSI report excludes beam coefficients for one or more beams for at least one of the one or more spatial layers, and wherein a number of the one or more beams corresponds to an amount that the number of beams to be reported in the CSI report exceeds the number of non-zero-power beams; and
parsing the at least one beam coefficient based at least in part on the CSI report.

23. The method of claim 22, wherein transmitting the set of reference signals comprises:
transmitting reference signals over respective antenna ports, wherein each beam of the set of beams corresponds to one of the antenna ports.

24. The method of claim 22, wherein the indicator of the at least one non-zero-power beam comprises an indicator of zero-power beams, the method further comprising:
determining a set of non-zero-power beams based on the indicator and the set of beams.

25. The method of claim 22, wherein the set of beams applies to a first set of antenna ports and a second set of antenna ports for the one or more spatial layers.

26. The method of claim 25, wherein each non-zero-power beam of the number of non-zero-power beams applies to the first set of antenna ports and the second set of antenna ports on each of the one or more spatial layers.

27. The method of claim 25, wherein each non-zero-power beam of the at least one non-zero-power beam applies to the first set of antenna ports and the second set of antenna ports on each of the one or more spatial layers.

28. The method of claim 27, wherein the set of bits indicating the number of non-zero-power beams in the set of beams comprises a power indicator bit for each beam of the number of non-zero-power beams.

29. The method of claim 25, wherein the multiple sets of bits comprise a first set of bits indicating a first number of non-zero-power beams for the first set of antenna ports and the second set of antenna ports for a first spatial layer of the one or more spatial layers and a second set of bits indicating a second number of non-zero-power beams for the first set of antenna ports and the second set of antenna ports for a second spatial layer of the one or more spatial layers.

30. The method of claim 25, wherein the multiple sets of bits comprise a first set of bits indicating a first set of non-zero-power beams for the first set of antenna ports and the second set of antenna ports for a first spatial layer of the one or more spatial layers and a second set of bits indicating a second set of non-zero-power beams for the first set of antenna ports and the second set of antenna ports for a second spatial layer of the one or more spatial layers.

31. The method of claim 30, wherein each set of bits comprises a power indicator bit for each beam of the corresponding set of non-zero-power beams.

32. The method of claim 25, wherein the multiple sets of bits comprise a first set of bits indicating a first number of non-zero-power beams in the set of beams for the first set of antenna ports and a second set of bits indicating a second number of non-zero-power beams in the set of beams for the second set of antenna ports, each non-zero-power beam of the first number of non-zero-power beams and each non-zero-power beam of the second number of non-zero-power beams applying to each of the one or more spatial layers.

33. The method of claim 25, wherein the multiple sets of bits comprise a first set of bits indicating a first set of non-zero-power beams in the set of beams for the first set of antenna ports and a second set of bits indicating a second set of non-zero-power beams in the set of beams having the second set of antenna ports, each non-zero-power beam of the first set of non-zero-power beams and each non-zero-power beam of the second set of non-zero-power beams applying to each of the one or more spatial layers.

34. The method of claim 33, wherein the first set of bits comprises a power indicator bit for each beam of a set of non-zero-power beams over the first set of antenna ports and the second set of bits comprises a power indicator bit for each beam of the set of non-zero-power beams over the second set of antenna ports.

35. The method of claim 25, wherein the one or more spatial layers comprise a plurality of spatial layers, and wherein the indicator comprises a respective set of bits indicating a respective number of non-zero-power beams for each of the first set of antenna ports and the second set of antenna ports for each of the plurality of spatial layers.

36. The method of claim 25, wherein the one or more spatial layers comprise a plurality of spatial layers, and wherein the indicator comprises a respective set of bits indicating a respective set of non-zero-power beams for each of the first set of antenna ports and the second set of antenna ports for each of the plurality of spatial layers.

37. The method of claim 36, wherein each of the respective sets of bits comprises a power indicator bit for each beam of the set of non-zero-power beams for a corresponding set of antenna ports and a corresponding spatial layer.

38. The method of claim 25, wherein the first set of antenna ports or the second set of antenna ports correspond to a same polarization, or a same antenna panel, or a combination thereof.

39. The method of claim 22, wherein the CSI report further comprises a rank indication (RI).

40. The method of claim 39, wherein the RI and the indicator are encoded separately.

41. The method of claim 22, wherein the at least one beam coefficient for each non zero-power beam of the subset comprises a wideband beam amplitude, a subband beam amplitude, a subband beam phase, or a combination thereof and wherein a reporting payload size of the at least one beam coefficient for each non-zero-power beam of the set of beams is based at least in part on the indicator.

42. The method of claim 22, wherein the configuration is transmitted via radio resource control (RRC) signaling, a medium access control (MAC) control element (CE), or downlink control signaling, the configuration further comprising a reporting setting.

43. An apparatus for wireless communication, comprising:
means for receiving a configuration indicating a number of beams to be reported in a channel state information (CSI) report;
means for receiving a set of reference signals,
wherein, for one or more spatial layers, a set of beams corresponding to the number of beams to be reported in the CSI report is based at least in part on the set of reference signals, and
wherein the set of beams comprises at least one non-zero-power beam; and
means for transmitting the CSI report comprising a beam coefficient for each of the at least one non-zero-power beam for each of the one or more spatial layers and an indicator of the at least one non-zero-power beam, wherein the indicator comprises multiple sets of bits and each set of bits indicates a number of non-zero-power beams for a corresponding spatial layer of the one or more spatial layers, wherein the CSI report excludes beam coefficients for one or more beams for at least one of the one or more spatial layers, and wherein a number of the one or more beams corresponds to an amount that the number of beams to be reported in the CSI report exceeds the number of non-zero-power beams.

44. The apparatus of claim 43, further comprising:
means for receiving each reference signal over a respective antenna port of a set of antenna ports, wherein each beam of the set of beams corresponds to an antenna port of the set of antenna ports.

45. The apparatus of claim 43, wherein the indicator of the at least one non-zero-power beam comprises an indicator of zero-power beams, and wherein a set of non-zero-power beams is determined based on the indicator and the set of beams.

46. The apparatus of claim 43, wherein:
the at least one non-zero-power beam applies to at least one of a first set of antenna ports or a second set of antenna ports for the one or more spatial layers.

47. An apparatus for wireless communication, comprising:
means for transmitting, to a user equipment (UE), a configuration indicating a number of beams to be reported in a channel state information (CSI) report;
means for transmitting a set of reference signals;
means for receiving the CSI report from the UE, wherein the CSI report indicates a set of beams corresponding to the number of beams to be reported in the CSI report, the CSI report further comprising a set of beam coefficients for each non-zero-power beam of the set of beams for each of one or more spatial layers and an indicator of at least one non-zero-power beam in the set of beams, wherein the indicator comprises multiple sets of bits and each set of bits indicates a number of non-zero-power beams for a corresponding spatial layer of the one or more spatial layers, wherein the CSI report excludes beam coefficients for one or more beams for at least one of the one or more spatial layers, and wherein a number of the one or more beams corresponds to an amount that the number of beams to be reported in the CSI report exceeds the number of non-zero-power beams; and means for parsing the set of beam coefficients based at least in part on the indicator of the non-zero-power beams.

48. The apparatus of claim 47, further comprising:
means for transmitting the set of reference signals over respective antenna ports, wherein each beam of the set of beams corresponds to one of the antenna ports.

49. The apparatus of claim 47, wherein the indicator of the at least one non-zero-power beam comprises an indicator of zero-power beams, the method further comprising:
means for determining a set of non-zero-power beams based on the indicator and the set of beams.

50. The apparatus of claim 47, wherein the set of beams applies to a first set of antenna ports and a second set of antenna ports for the one or more spatial layers.

51. An apparatus for wireless communication, comprising:
a processor;
memory in electronic communication with the processor; and
instructions stored in the memory and operable, when executed by the processor, to cause the apparatus to:
receive a configuration indicating a number of beams to be reported in a channel state information (CSI) report;
receive a set of reference signals,
wherein, for one or more spatial layers, a set of beams corresponding to the number of beams to be reported in the CSI report is based at least in part on the set of reference signals, and
wherein the set of beams comprises at least one non-zero-power beam; and
transmit the CSI report comprising at least one beam coefficient for each of the at least one non-zero-power beam for each of the one or more spatial layers and an indicator of the at least one non-zero-power beam, wherein the indicator comprises multiple sets of bits and each set of bits indicates a number of non-zero-power beams for a corresponding spatial layer of the one or more spatial layers, wherein the CSI report excludes beam coefficients for one or more beams for at least one of the one or more spatial layers, and wherein a number of the one or more beams corresponds to an amount that the number of beams to be reported in the CSI report exceeds the number of non-zero-power beams.

52. The apparatus of claim 51, wherein the instructions are further executable by the processor to:
receive each reference signal over a respective antenna port of a set of antenna ports, wherein each beam of the set of beams corresponds to an antenna port of the set of antenna ports.

53. The apparatus of claim 51, wherein the indicator of the at least one non-zero-power beam comprises an indicator of zero-power beams, and wherein a set of non-zero-power beams is determined based on the indicator and the set of beams.

54. The apparatus of claim 51, wherein:
the at least one non-zero-power beam applies to at least one of a first set of antenna ports or a second set of antenna ports for the one or more spatial layers.

55. The apparatus of claim 54, wherein each non-zero-power beam of the number of the non-zero-power beams applies to the first set of antenna ports and the second set of antenna ports on each of the one or more spatial layers.

56. The apparatus of claim 54, wherein each non-zero-power beam of the at least one non-zero-power beam applies to the first set of antenna ports and the second set of antenna ports on each of the one or more spatial layers.

57. The apparatus of claim 56, wherein the set of bits indicating the number of non-zero-power beams in the set of beams comprises a power indicator bit for each beam of the number of non-zero-power beams.

58. The apparatus of claim 54, wherein the multiple sets of bits comprise a first set of bits indicating a first number of non-zero-power beams for the first set of antenna ports and the second set of antenna ports for a first spatial layer of the one or more spatial layers and a second set of bits indicating a second number of non-zero-power beams for the first set of antenna ports and the second set of antenna ports for a second spatial layer of the one or more spatial layers.

59. The apparatus of claim 54, wherein the multiple sets of bits comprise a first set of bits indicating a first set of non-zero-power beams for the first set of antenna ports and the second set of antenna ports for a first spatial layer of the one or more spatial layers and a second set of bits indicating a second set of non-zero-power beams for the first set of antenna ports and the second set of antenna ports for a second spatial layer of the one or more spatial layers.

60. The apparatus of claim 59, wherein each set of bits comprises a power indicator bit for each beam of a set of non-zero-power beams.

61. The apparatus of claim 54, wherein the multiple sets of bits comprise a first set of bits indicating a first number of non-zero-power beams in the set of beams for the first set of antenna ports and a second set of bits indicating a second number of non-zero-power beams in the set of beams for the second set of antenna ports, each non-zero-power beam of the first number of non-zero-power beams and each non-zero-power beam of the second number of non-zero-power beams applying to each of the one or more spatial layers.

62. The apparatus of claim 54, wherein the multiple sets of bits comprise a first set of bits indicating a first set of non-zero-power beams in the set of beams for the first set of antenna ports and a second set of bits indicating a second set of non-zero-power beams in the set of beams for the second set of antenna ports, each non-zero-power beam of the first set of non-zero-power beams and each non-zero-power beam of the second set of non-zero-power beams applying to each of the one or more spatial layers.

63. The apparatus of claim 62, wherein the first set of bits comprises a power indicator bit for each beam of a set of non-zero-power beams over the first set of antenna ports and the second set of bits comprises a power indicator bit for each beam of the set of non-zero-power beams over the second set of antenna ports.

64. The apparatus of claim 54, wherein the one or more spatial layers comprise a plurality of spatial layers, and wherein the indicator comprises a respective set of bits indicating a respective number of non-zero-power beams for each of the first set of antenna ports and the second set of antenna ports for each of the plurality of spatial layers.

65. The apparatus of claim 54, wherein the one or more spatial layers comprise a plurality of spatial layers, and wherein the indicator comprises a respective set of bits indicating a respective set of non-zero-power beams for each of the first set of antenna ports and the second set of antenna ports for each of the plurality of spatial layers.

66. The apparatus of claim 65, wherein each of the respective sets of bits comprises a power indicator bit for each beam of the set of non-zero-power beams for a corresponding set of antenna ports and a corresponding spatial layer.

67. The apparatus of claim 54, wherein the first set of antenna ports or the second set of antenna ports correspond to a same polarization, or a same antenna panel, or a combination thereof.

68. The apparatus of claim 51, wherein the CSI report further comprises a rank indication (RI).

69. The apparatus of claim 68, wherein the RI and the indicator are encoded separately.

70. The apparatus of claim 51, wherein the at least one beam coefficient for each non-zero-power beam of the set of beams comprises a wideband beam amplitude, a subband beam amplitude, a subband beam phase, or a combination thereof and wherein a reporting payload size of the at least one beam coefficient for each non-zero-power beam of the set of beams is based at least in part on the indicator.

71. The apparatus of claim 51, wherein the configuration is received via radio resource control (RRC) signaling, a medium access control (MAC) control element (CE), or downlink control signaling, the configuration further comprising a reporting setting.

72. An apparatus for wireless communication, comprising: a processor; memory in electronic communication with the processor; and instructions stored in the memory and operable, when executed by the processor, to cause the apparatus to:
  transmit, to a user equipment (UE), a configuration indicating a number of beams to be reported in a channel state information (CSI) report;
  transmit a set of reference signals;
  receive the CSI report from the UE, wherein the CSI report indicates a set of beams corresponding to the number of beams to be reported in the CSI report, the CSI report further comprising a set of beam coefficients for each non-zero-power beam of the set of beams for each of one or more spatial layers and an indicator of at least one non-zero-power beam in the set of beams, wherein the indicator comprises multiple sets of bits and each set of bits indicates a number of non-zero-power beams for a corresponding spatial layer of the one or more spatial layers, wherein the CSI report excludes beam coefficients for one or more beams for at least one of the one or more spatial layers, and wherein a number of the one or more beams corresponds to an amount that the number of beams to be reported in the CSI report exceeds the number of non-zero-power beams; and
  parse the set of beam coefficients based at least in part on the indicator of the non-zero-power beams.

73. The apparatus of claim 72, wherein the instructions are further executable by the processor to:
  transmit the set of reference signals over respective antenna ports, wherein each beam of the set of beams corresponds to one of the antenna ports.

74. The apparatus of claim 72, wherein the indicator of the at least one non-zero-power beam comprises an indicator of zero-power beams, and wherein the instructions are further executable by the processor to:
  determine a set of non-zero-power beams based on the indicator and the set of beams.

75. The apparatus of claim 72, wherein the set of beams applies to a first set of antenna ports and a second set of antenna ports for the one or more spatial layers.

76. A non-transitory computer readable medium storing code for wireless communication, the code comprising instructions executable by a processor to:
  receive a configuration indicating a number of beams to be reported in a channel state information (CSI) report;
  receive a set of reference signals,
    wherein, for one or more spatial layers, a set of beams corresponding to the number of beams to be reported in the CSI report is based at least in part on the set of reference signals, and
    wherein the set of beams comprises at least one non-zero-power beam; and
  transmit the CSI report comprising beam coefficients for each of the at least one non-zero-power beam for each of the one or more spatial layers and an indicator of the at least one non-zero-power beam, wherein the indicator comprises multiple sets of bits and each set of bits indicates a number of non-zero-power beams for a corresponding spatial layer of the one or more spatial layers, wherein the CSI report excludes beam coefficients for one or more beams for at least one of the one or more spatial layers, and wherein a number of the one or more beams corresponds to an amount that the number of beams to be reported in the CSI report exceeds the number of non-zero-power beams.

77. A non-transitory computer readable medium storing code for wireless communication, the code comprising instructions executable by a processor to:
  transmit, to a user equipment (UE), a configuration indicating a number of beams to be reported in a channel state information (CSI) report;
  transmit a set of reference signals;
  receive the CSI report from the UE, wherein the CSI report indicates a set of beams corresponding to the number of beams to be reported in the CSI report, the CSI report further comprising a set of beam coefficients for each non-zero-power beam of the set of beams for each of one or more spatial layers and an indicator of at least one non-zero-power beam in the set of beams, wherein the indicator comprises multiple sets of bits and each set of bits indicates a number of non-zero-power beams for a corresponding spatial layer of the one or more spatial layers, wherein the CSI report excludes beam coefficients for one or more beams for at least one of the one or more spatial layers, and wherein a number of the one or more beams corresponds to an amount that the number of beams to be reported in the CSI report exceeds the number of non-zero-power beams; and
  parse the set of beam coefficients based at least in part on the indicator of the non-zero-power beams.

* * * * *